(12) United States Patent
Chawla et al.

(10) Patent No.: US 6,876,668 B1
(45) Date of Patent: Apr. 5, 2005

(54) APPARATUS AND METHODS FOR DYNAMIC BANDWIDTH ALLOCATION

(75) Inventors: Hamesh Chawla, San Leandro, CA (US); John G. Waclawsky, Fredrick, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/317,381

(22) Filed: May 24, 1999

(51) Int. Cl.$^7$ ................................................. H04J 3/16
(52) U.S. Cl. ...................................... 370/468; 370/230
(58) Field of Search .................................. 370/230, 231, 370/232, 389, 468, 395.64, 395.65, 230.1, 233, 234, 235, 236.1, 236.2; 709/228, 229

(56) References Cited

U.S. PATENT DOCUMENTS

| 5,884,037 A | | 3/1999 | Aras et al. ............. 395/200.56 |
| 6,031,841 A | * | 2/2000 | Woundy ...................... 370/410 |
| 6,336,129 B1 | * | 1/2002 | Ise et al. ..................... 370/235 |
| 6,353,616 B1 | * | 3/2002 | Elwalid et al. ............. 370/389 |

OTHER PUBLICATIONS

Brandon, R. et al., "Resource ReSerVation Protocol (RSVP)—Version 1 Functional Specification," <ftp://ftp/isi.edu/in-notes/rfc2205.txt>, Network Working Group Request for Comments, 99 pages, Sep. 1997.
Steve Berson, "RSVP Protocol Overview," (Last Modified Mar. 5, 1999) <http://www.isi.edu/rsvp/overview.html>, 2 Pages.
Medhavi Bhatia, "QoS over the Internet: The RSVP protocol," <http://www/cis/upenn.edu/~bhatia/rsvp.html> (visited Apr. 30, 1999).

* cited by examiner

*Primary Examiner*—Steven Nguyen
*Assistant Examiner*—Thien D Tran
(74) *Attorney, Agent, or Firm*—Barry W. Chapin, Esq.; Chapin & Huang, LLC

(57) ABSTRACT

A system capable of dynamically reserving bandwidth and adjusting bandwidth reservations for active sessions of data communication in a data communications device is provided. The system generally separates the operation of bandwidth allocation and adjustment from the operation of data transport through the device, thereby allowing bandwidth reservations and adjustments to be made without disturbing sessions of data communication that are actively being transported through the device. The system can accept requests to allocate or reserve bandwidth in a data communications device using bandwidth reservation protocols such as RSVP. The reservation requests create sender state data that can be used to compute resource allocation data. The resource allocation data can be used to label data storage locations in a data storage mechanism according to the required bandwidth reservations. A data scheduling apparatus, which is ignorant of particular sessions and specific amounts of reserved bandwidth, examines data and deposits data into data storage locations having a label corresponding to a session identification specified in the data, if any. If an unknown or no session identification is specified in the data, the data scheduler deposits data into a data storage location that is unlabeled or that has an unreserved label. Thus session bandwidth is determined by the percentage of labeled data storage locations for the session. Changes in bandwidth reservations are reflected in the separate operation of alterations made in the data storage labeling scheme, and do not affect the data scheduler, or data dequeuing mechanisms, thus allowing data sessions to continue without interruption during bandwidth adjustments.

29 Claims, 9 Drawing Sheets

RESOURCE ALLOCATION CALCULATION PROCESSING

LABEL CALCULATION PROCESSING

APPARATUS AND METHODS FOR DYNAMIC BANDWIDTH ALLOCATION

BACKGROUND OF THE INVENTION

A typical data communications network includes many hosts interconnected by various data communication devices. The data communication devices can be routers, bridges, switches, access servers, gateways, hubs, concentrators, proxy servers, repeaters and so forth which exchange data over an interconnection of data links. The data links may be physical connections or may be provided using wireless communication mechanisms. The network allows data to propagate between various applications that execute on the hosts. The hosts are often general purpose computer systems such as personal computers, workstations, minicomputers, mainframes and the like, or the hosts may be dedicated devices such as website kiosks, facsimile servers, video servers, audio servers, and so forth. Each host couples to one or more of the data communications devices that form the network.

Various physical or hardware data communications connection mechanisms allow the hosts to interconnect with the network. Physical data communications connection mechanisms can include modems, transceivers, network interface cards, fiber optic cards, ports and other hardware devices which allow data to be transferred at various data transfer rates (i.e., bandwidths) to and from the hosts and between data communications devices. For example, certain hosts may have high-speed network interfaces which provide connections to the network at high data rates such as fractional-T1, T1, E1 or higher, while other hosts may use an inexpensive modem that provides a maximum data transfer rate of 56.6 kilobits per second (Kbps) to and from the network.

Depending upon a specific use of the host which often depends on an application running on a host, data traveling across the network that is associated with those applications may require different levels of data service (i.e., data transfer rates or network bandwidth). For example, a distributed applications protocol such as the Multicasting Protocol can be used to serve streams of data from one or more source hosts to one or more destination hosts which subscribe to the stream (called joining a multicast group). A multicasting video server coupled to the network may require a minimum amount of network bandwidth to be supplied from itself to all other hosts that require access to the streams of transmitted multicasted video. Another host may be supplying multicasted audio streams to remote destination hosts throughout the network. Though streaming audio data typically requires less network bandwidth than streaming video data (which usually contains encoded audio data as well as video images), both data types require a certain guaranteed minimum quality of service or QoS since each of these data types requires real-time transmission. The real-time bandwidth requirements of video or audio data contrast sharply with best-effort only bandwidth requirements associated with non-urgent data such as E-mail communications which can be delayed in the network for prolonged periods without affecting the intended purpose or performance of the E-mail application.

As another example of the need for varying bandwidth requirements, hosts that connect or subscribe to networks using high speed connection mechanisms such T1 interface cards generally expect to be provided with, and often pay a premium for the ability to send and receive data across the network at T1 data rates. Other hosts may not require such high data transfer rates and therefore only subscribe to the network and pay for the capability to transfer data at lower data transfer rates. In either case, the data communications devices in the network must be able to distinguish and handle the flows of data from hosts having differing levels or qualities of service.

Since many connections, sessions or data traffic flows (i.e., data associated with an end-to-end application or stream) from multiple hosts with potentially different data rates are frequently switched, routed or transferred through the same data communication devices in a network such as the Internet, the data communications devices must provide a way to establish, allocate or reserve the bandwidth requirements for the various flows, sessions, or connections. Once the bandwidth is allocated, the devices must distinguish the different data flows or connections requiring the different levels of service (i.e., different data rates or bandwidth requirements). Once distinguished, the data communications devices must be able to service each connection or flow at its prescribed level of service. For example, if T1 service is required, the data communications devices must identify and transport data on T1 or higher speed links through the network at T1 speeds, while data from slower links should at least be transferred through the network at a minimum subscription rate of those links. Management of the various data transmission and propagation requirements associated with data having differing levels of service is a well known problem associated with data communications devices in modern networks.

Various bandwidth allocation or reservation protocols have been developed for use in modern networks to provide guaranteed QoS or controlled end-to-end delays for transmitted data. These protocols allow applications that exchange data between sending and receiving hosts to establish reservations of bandwidth over the network for the various services required by the applications. One such protocol is called RSVP, which stands for the ReSerVation Protocol.

As its name implies, hosts use RSVP to request a specific QoS from the network on behalf of an application data stream. RSVP carries the request through the network, visiting each data communications device or node that the network will use to carry the stream. At each node, RSVP attempts to make a resource (i.e. bandwidth) reservation for the stream. Once bandwidth is reserved in each node on the network path from sender to receiver, the sender can commence transmission of the stream using the reserved network bandwidth. The QoS for that stream is generally guaranteed since the bandwidth is reserved for use by that particular stream (e.g., Multicast group) and no other.

FIG. 1 illustrates a typical architecture and data flow of a prior art data communications device 100 configured to use RSVP. Traditionally, to make a resource reservation in the data communications device 100 (e.g. a router), an RSVP daemon 101 executing on the device 100 communicates with two local decision modules, admission control 102 and policy control 103. Admission control 102 determines whether the device 100 has sufficient available resources (e.g., buffer capacity, processor and I/O bandwidth) to supply the requested QoS. Policy control 103 determines whether a user, host or application (typically on another device or host) requesting the bandwidth reservation has administrative permission (i.e. access control) to make the reservation. If either check fails, the RSVP daemon 101 returns an error notification to the application process that originated the request. If both the admission and policy control checks succeed, the RSVP daemon 101 defines a set of filterspec parameters provided to a packet classifier 104 and a set of flowspec parameters provided to the packet scheduler 106 to configure and obtain the desired QoS in the device 100 for that stream.

The packet classifier 104 uses the filterspec parameters to filter each packet (data in) that arrives at the device to determine the route and queue for the packet within the data queuing mechanism 105. For example, there may be many prioritized queues, each providing a specific level of service or QoS. The packet scheduler 106 uses the flowspec parameters to properly service the queues in the data queuing mechanism 105 to achieve the promised QoS for each stream. Typically, the packet scheduler 106 employs a weighted fair queuing algorithm to de-queue the data from the various queues in the data queuing mechanism 105 according to the bandwidth allocation requirements or QoS defined in the flowspec parameters.

FIG. 2 illustrates a prior art packet data structure 510 used to transport data in a data 2 stream for which RSVP has reserved bandwidth in data communications device 110. The data packet 510 includes an RSVP header field 180 followed by UDP and IP headers 181, 182 and the data 183. The RSVP header 180 typically includes various fields 184 through 191. Of particular interest is the Tspec field 191 which provides a description or identification of the traffic flow, session, or data stream to which this data packet 510 is associated. The packet classifier 104 and the packet scheduler 106 can use the Tspec field 191 to identify different flows of data and enforce the bandwidth allocations or QoS for each identified flow.

SUMMARY OF THE INVENTION

The RSVP protocol does not define how a device (e.g. 100 in FIG. 1) is to implement the actual bandwidth reservations allocated to a session or flow of data communication between hosts. Rather, RSVP simply provides a mechanism to exchange bandwidth reservation and path messages along the path of data communication between sending and receiving hosts. The reservation messages simply identify a session or stream of data communication and indicate a requested level of service for that stream of data. The path messages indicate where the data is to come from and also indicate where to transmit the data. The mechanisms to set aside or reserve the bandwidth resources in the device are implementation dependant.

Accordingly, RSVP only provides a framework for hosts to notify and request reservations of bandwidth in all data communications devices that are on paths between sending and receiving hosts. Once the data communications devices have agreed to reserve the requested bandwidth (i.e., admission and policy control), the implementation of how that bandwidth is actually reserved or set aside within each device is left up to the device and is not part of the RSVP protocol. The previously described prior art implementations of device bandwidth reservation mechanisms using customized packet classifiers and packet schedulers which operate in conjunction with the RSVP protocol have become quite popular.

However, one problem that stems from these prior art implementations is that they do not allow adjustments to be made to the amount of bandwidth reserved to a session of data communication without requiring the session to be interrupted. That is, once the prior art implementations of bandwidth reservation techniques (i.e. modified classifiers and schedulers) reserve a set amount of bandwidth between two or more hosts, the prior art implementations cannot adjust the amount of reserved bandwidth without clearing the session from end-to-end of all data in the path(s) between sending and receiving hosts. This essentially requires the sender(s) to stop sending session data to provide time for all session data in the network to clear and reach the intended receiver(s). In other words, if the bandwidth or QoS requirements of a session need to change (e.g., the receiver needs more bandwidth to properly receive the stream), the RSVP negotiation that must take place requires that the sending host halt data transmission for a period of time, while the sending and receiving hosts, and all data communication devices in between, clear themselves of the session data. Then, the sender and receiver must use another set of RSVP reservation and path messages to adjust (i.e., increase or decrease) the amount of bandwidth allocated between the sender and receiver hosts to meet the new requirements.

One reason that current implementations of RSVP do not allow bandwidth adjustments once a communication session is in progress is not due to limitations of the RSVP protocol. Rather, the design of prior art data communications devices that support RSVP impose the limitations. A customized data classifier 104 and scheduler 106 support RSVP bandwidth reservation requests and enforce the bandwidth allocation requirements in prior art data communications devices that support RSVP. The RSVP daemon 101 periodically updates the customized classifier 104 with filterspec information which allows the classifier 104 to properly examine and classify packets of data with the flow identification associated with the packets. If a packet is associated with a flow of data for which bandwidth has been allocated via RSVP, the customized classifier 104, for example, directs this packet to a queue reserved for this flow. Once queued, the customized scheduler 106 typically uses a weighted fair queuing algorithm to dequeue the data from the various queues according to the bandwidth allocation requirements associated with the various flows of data in relation to each queue as defined by flowspec requirements.

By way of example, if the classifier 104 identifies data associated with a session having a high bandwidth reservation, the classifier 104 may queue the data in a high bandwidth queue. The scheduler 106 may service the high bandwidth queue more frequently that other queues which may have lower bandwidth allocations or reservations which are serviced less frequently. Since the classifier, the scheduler, and sometimes the queuing structure are all involved in prior art device specific implementations of bandwidth reservation using RSVP, data associated with a specific session may exist in any one of these components in the device at any point in time. Hence, if the RSVP daemon 101 were to attempt to change the allocation of reserved bandwidth during an active session of data communication, the scheduler 106 might need to reconfigure queuing structures and the classifier 104 might need to be made aware of the new bandwidth allocation scheme for that session. If data communications devices using prior art implementations of RSVP attempted to dynamically reconfigure bandwidths allocated to sessions of data communication during transport of those sessions, significant delays and/or lost data would result for flows using the data communications device.

To avoid such losses or delays of data, prior art implementations of RSVP require that the sending host halt the transmission of data and that all data be flushed through the network to the receiver. Once the prior art devices clear the network of any data associated with a specific session of data communication, the prior art devices use another sequence of RSVP messages to adjust bandwidth and establish a new session. Once the prior art devices have established a new bandwidth allocation, a new session of data communication must be reinitiated.

The present invention avoids the prior art situation of requiring a break in a data communication session in order to re-allocate or adjust bandwidth reserved for a session. The present invention provides a device implementation that can accept bandwidth allocation changes and can dynamically adjust bandwidth during an active session of data communication using a protocol such as RSVP without requiring a pause or break in the transmission of data along the entire path from sender(s) to receiver(s). This can be accomplished since the present invention manages resources, and is not focused on managing time.

More specifically, the present invention provides a data communications device capable of dynamically adjusting reserved bandwidth while maintaining a session of data communication. The device includes an input for receiving data including bandwidth reservation requests and a data storage mechanism including data storage locations. Also included is a bandwidth reservation processor coupled to the input port which accepts a first bandwidth reservation request indicating a first amount of bandwidth to reserve for the session of data communication in the data communications device. The bandwidth reservation processor then establishes a first bandwidth reservation associated with a session of data communication in the data storage locations. A data scheduler is included and is coupled to the input port and coupled to the data storage mechanism. The data scheduler receives data associated with the session of data communication and deposits the data associated with the session of data communication into the data storage locations associated with the first bandwidth reservation. Using such a mechanism, data transport is separated from bandwidth reservation and allocation. The bandwidth reservation may enforce reservations for high priority traffic, for example.

In another embodiment which allows dynamic adjustments to the bandwidth reservation already in effect, the bandwidth reservation processor receives bandwidth allocation adjustment information from the input port during the session of data communication and dynamically adjusts the first bandwidth reservation in the data storage locations to produce a second bandwidth reservation for the session of data communication in accordance with the bandwidth allocation adjustment information. This apparatus performs this operation while the data scheduler continually receives and deposits data associated with the session of data communication into the data storage locations associated with the session of data communication. In other words, the session of data communication continues during the bandwidth adjustment processing.

In a more detailed embodiment, the bandwidth reservation processor includes a bandwidth request handler coupled to the input port to receive bandwidth reservation requests. Also provided is a bandwidth labeler coupled to the bandwidth request handler and coupled to the data storage locations. The bandwidth labeler receives bandwidth allocation information indicated in the first bandwidth reservation request and labels, with an identity of the session of data communication, a first available percentage of the data storage locations used to store data transported through the data communications device thus establishing the first bandwidth reservation.

Another embodiment is provided in which the bandwidth reservation processor further includes a resource allocation table accessible by the bandwidth labeler and a resource allocation calculator coupled to access the resource allocation table independently of the bandwidth labeler. The resource allocation calculator receives the bandwidth allocation information indicated in the first bandwidth reservation request and calculates and stores in the resource allocation table a first percentage of total device bandwidth to allocate to the session of data communication based upon the first bandwidth reservation request. Using these mechanisms, the bandwidth reservation processor can continually allow for bandwidth adjustments over time without disturbing the session of data communication for which the bandwidth reservation exist.

Another embodiment of the invention provides a system for reserving bandwidth in a data communications device. The system includes a bandwidth request handler that accepts a first bandwidth reservation request indicating a first amount of bandwidth to reserve for a session of data communication in the data communications device. Also included is a bandwidth labeler coupled to the bandwidth request handler. The bandwidth labeler labels, with an identity of the session of data communication, a percentage of available data storage locations used to store data transported through the data communications device to establish a first bandwidth reservation. The percentage of storage locations labeled is based upon the first amount of bandwidth requested as indicated in the first bandwidth reservation request. Preferably, the data storage locations for a path or session of data communication are in the form of a single rotating queue structure.

Similar to this embodiment, another embodiment is a data communications device that includes a bandwidth reservation processor that processes requests to reserve bandwidth for a session of data communications and labels a percentage of available data storage locations in the data communications device with a session identifier. A data transporter in this embodiment concurrently processes and transports data through a data communications device using the available data storage locations to store data as it is processed. The data transporter deposits only data having a corresponding identifier equivalent to the session identifier of the storage locations into the data storage locations labeled with the session identifier. In this manner, only labeled storage location are use for session data and comprise the reserved bandwidth.

The aforementioned apparatus embodiments perform processing that is unique to this invention as well. The processing steps also are embodiments of the invention and are summarized below.

Specifically, one processing or method embodiment provides a method for separately handling bandwidth reservation processing in a data communications device from data transport processing. The method includes the steps of processing requests to reserve bandwidth for a session of data communications and labeling a percentage of available data storage locations in the data communications device with a session identifier. Also, the method includes the step of concurrently processing and transporting data through a data communications device using the available data storage locations to store the data as it is processed, and depositing only data having a corresponding identifier equivalent to the session identifier of the storage locations into the data storage locations labeled with the session identifier. Using such a method, the device can reserve bandwidth while concurrently processing session data in the device.

In another method of the invention, the step of processing requests, processes requests to change an amount of reserved bandwidth associated with the session of data communication.

In yet another method embodiment, a method of storing bandwidth reservation information is provide and includes the steps of accepting a bandwidth reservation request indicating an amount of bandwidth to reserve for a session of data communication. Then, the step of calculating a percentage of total device bandwidth to allocate to the session of data communication based upon the bandwidth reservation request is performed. This is then followed by the step of storing the percentage in a resource allocation table which is independently accessible by a flow labeler.

Another embodiment of the invention provides a method for dynamically adjusting reserved bandwidth in a data communications device while transporting a session of data communication within the device. This method embodiment includes the steps of establishing a first bandwidth reservation associated with a session of data communication in the data communications device. This may be done, for example, by accepting a first bandwidth reservation request indicating a first amount of bandwidth to reserve for the session of data communication in the data communications device and by labeling, with an identity of the session of data communication, a first percentage of available data storage locations used to store data transported through the data communications device thus establishing the first bandwidth reservation. The first percentage of storage locations labeled is generally based upon the first amount of bandwidth requested as indicated in the first bandwidth reservation request.

Preferably, after the step of accepting a first bandwidth reservation request, the step of establishing a first bandwidth reservation further includes the step of calculating and storing a first percentage of total device bandwidth to allocate to the session of data communication based upon the first bandwidth reservation request. The first percentage of data storage locations labeled in the step of labeling is based upon the calculated first percentage of total device bandwidth to allocate to the session of data communication. Also, the step of calculating and storing preferably stores the calculated first percentage in a resource allocation table which is independently accessible by the step of labeling and the step of dynamically adjusting, so as to allow the step of dynamically adjusting to alter the calculated percentage in the resource allocation table without disrupting the step of labeling, thus allowing the bandwidth reservation in the device to be adjusted without effecting operation of a step of transporting (summarized below). Accordingly, data storage locations are labeled in accordance with the bandwidth requests and the labeling of the locations inherently reserves the bandwidth for sessions associated with the label.

As noted above, the embodiment also includes the step of transporting, through the data communication device, data associated with the session of data communication utilizing data storage locations associated with the first bandwidth reservation. The step of transporting can deposit the data associated with the session of data communication into data storage locations having an identification associated with the session of data communication and does so independently of how the identification associated with the session of data communication is created. Preferably, this step of transporting deposits the data associated with the session of data communication only into those data storage locations having an identification associated with the session of data communication. In other words, storage locations are labeled with an identity of a session of data communication for which bandwidth is reserved and during data transport, data associated with that session of data communication is placed into the labeled storage locations corresponding to the session. Preferably, other data not associated with the session of communication does not use the labeled locations, since they are reserved for the session data only. In this manner, the number of labeled locations selected from a total set of available location, such as labeling selected data storage locations in a single large rotating queue, are reserved for the session data.

The embodiment also includes the step of receiving bandwidth allocation adjustment information during the session of data communication. Preferably, this is done via a resource allocation protocol such as RSVP. That is, the data communications device uses an RSVP protocol to determine an amount of bandwidth to reserve.

Furthermore, the embodiment includes the step of dynamically adjusting the first bandwidth reservation to produce a second bandwidth reservation for the session of data communication in accordance with the bandwidth allocation adjustment information while continually maintaining the session of data communication.

In another embodiment based on the former embodiment, the step of dynamically adjusting the first bandwidth reservation to produce a second bandwidth reservation includes the steps of accepting a second bandwidth reservation request indicating a second amount of bandwidth to reserve for the session of data communication, and labeling, with an identity of the session of data communication, a second percentage of available data storage locations used to store data transported through the data communications device thus establishing the second bandwidth reservation. The second percentage of storage locations labeled is based upon the second amount of bandwidth requested as indicated in the second bandwidth reservation request, and the second percentage of storage locations labeled is different than the first percentage of storage locations labeled. This allows bandwidth to be adjusted by altering the labeled percentages for storage locations (e.g. in the single rotating queuing structure) associated with (i.e., labeled to receive) various sessions of data communication.

In another embodiment, after the step of dynamically adjusting the first bandwidth reservation to produce a second bandwidth reservation completed, the method further includes the step of calculating and storing a second percentage of total device bandwidth to allocate to the session of data communication based upon the second bandwidth reservation request. The second percentage of data storage locations labeled in the step of labeling is based upon the calculated second percentage of total device bandwidth to allocate to the session of data communication. The second percentage replaces the first percentage calculated previously.

Preferably, the step of calculating and storing stores the calculated second percentage in a resource allocation table as a replacement for the calculated first percentage. The step of calculating can include the steps of obtaining a current measurement of data communications device data storage locations available for data storage and a current bandwidth utilization rate and then computing an amount of bandwidth to reserve for the session of data communication based on the current bandwidth utilization rate and on the current measurement of data communication device data storage locations available for data storage.

The resource allocation table is independently accessible by the step of labeling and the step of dynamically adjusting, so as to allow the step of dynamically adjusting to alter the calculated first percentage in the resource allocation table without disrupting the step of labeling, thus allowing the first bandwidth reservation in the device to be adjusted without effecting operation of the step of transporting. The resource allocation table may be a database, table, linked list, object, or other data structure or storage mechanism used to store resource allocation data as described herein.

In another embodiment, the step of dynamically adjusting the first bandwidth reservation to produce a second bandwidth reservation includes the steps of accepting a bandwidth reservation request indicating a specific amount of bandwidth to reserve for the session of data communication. Next, a step of calculating and storing a percentage of total device bandwidth to allocate to the session of data communication based upon the bandwidth reservation request is performed, followed by a step of labeling, with an identity of the session of data communication, a percentage of available data communication device data storage locations used to store data transported through the data communications device. In this embodiment, the labeled percentage is based upon the calculated percentage of total device bandwidth to allocate to the session of data communication. Thus, the data storage locations are labeled according to reserved bandwidth requirements.

Other apparatus embodiments include computer program product(s) having a computer-readable medium including computer program logic encoded thereon for allocating bandwidth in a data communications device. The computer program logic, when executed on one or more processing units with the data communications device, cause the processing unit(s) to perform any and all of the aforementioned methods steps. That is, since certain embodiments of the invention can be implemented in software, the computer program embodiments cover a disk or other computer readable medium encoded with instructions to execute the invention as a software program. The disks or other mediums themselves containing the code are actual embodiments of this invention.

The resource allocation information for bandwidth reservations is preferably stored in the resource allocation table. In one embodiment, a computer readable medium is provided that is encoded with a data structure. The data structure stores bandwidth allocation information. The bandwidth allocation information includes an identity of at least one session of data communication and a number representing a percentage of data storage locations to associate with the identity of the at least one session of data communication. The number representing the percentage of data storage locations to associate with the identity of the session of data communication is preferably a number indicating a number of labels to apply to data storage locations so as to reserve the data storage locations for the data associated with the at least one session of data communication. This data structure embodiment can be used to maintain bandwidth reservation information within a data communications device and can be dynamically changed to re-apportion bandwidth resources while the device concurrently and separately maintains the sessions of data communication.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

An brief overview of the invention will assist in understanding the discussion of detailed embodiments. Generally, the system of the invention allows a data communications device to dynamically reserve bandwidth and adjust bandwidth reservations for sessions of data communication without session disruption. The device can perform reservation and adjustment operations independently of sessions of data communication that are in progress (i.e. actively being transmitted) in the device and that may be using any currently reserved bandwidth resources. However, as the bandwidth is adjusted, the session(s) for which bandwidth adjustment is made are transported according to the new bandwidth reservation. That is, adjustments in reserved bandwidth for a session of data communication can be made without concerning or bothering the continual process of transporting data for that session, but the session data itself will be transported using the new bandwidth reservation as it is put in place, whether the new reservation is an increase or decrease in available bandwidth.

By having the device separate the operation of bandwidth allocation and adjustment from the continual operation of transporting data through the device, the device can perform bandwidth reservations and adjustments without disturbing the flow or sessions of data communication. The system can accept requests to allocate or reserve bandwidth in a data communications device using bandwidth reservation protocols such as RSVP. The reservation requests create sender state data that can be used to compute resource allocation data. The device uses the resource allocation data to associate labels with data storage locations in a data storage mechanism according to the required bandwidth reservations. A data scheduling apparatus, which is ignorant of particular sessions having specific amounts of reserved bandwidth, examines data and deposits data into data storage locations having an associated label corresponding to a session identification specified in the data, if any. This way, the device only places session data into the labeled storage locations reserved for that session data. If the data contains an unknown session identification (or none at all), the data scheduler deposits data into a data storage location that is unlabeled or that has an unreserved label. Thus the percentage of data storage locations labeled in a device for a session determines bandwidth reserved for the session. The data storage labeling scheme of the invention operates separately from the data scheduling, enqueuing and data dequeuing mechanisms to allow data sessions to continue without interruption during bandwidth adjustments.

Figure 3:
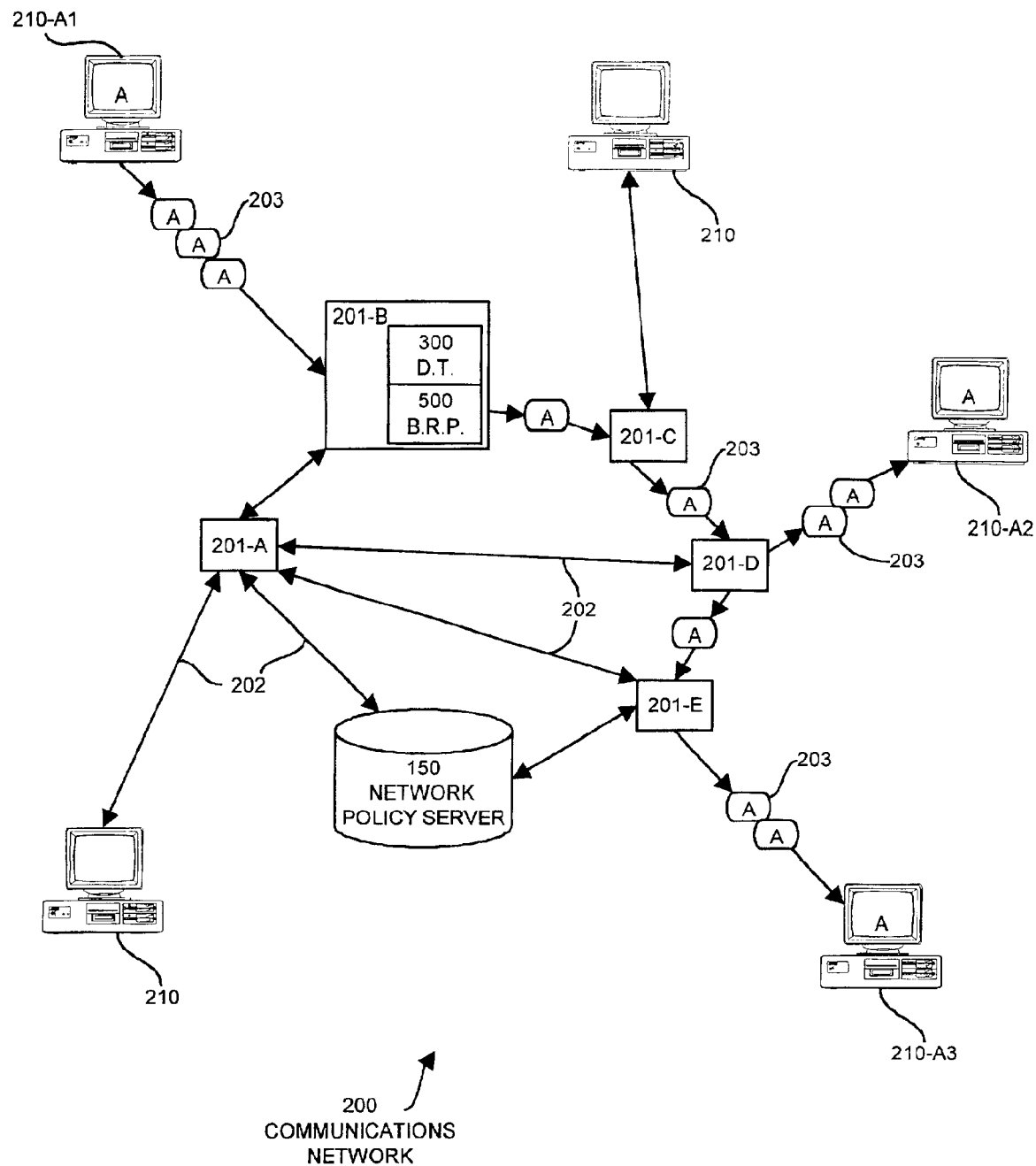
FIG. 3 illustrates a data communications networking environment using data communications devices configured to reserve bandwidth according to the invention.

FIG. 3 illustrates an example of a communications network 200 configured according to the invention. The network 200 includes data links 202 which interconnect data communications devices 201-A through 201-E, network policy server 150, and hosts 210 (including hosts 210-A1, 210-A2 and 210-A3). The data links 202 allow communications to take place between the various components shown in the figure and can be any type of communication medium including physical network cables, wires, fiber optic links, any type of wireless transmission links or another communications medium. Though the network 200 is illustrated as a relatively small network for ease of description of the invention, the invention is applicable to networks of all sizes, including interconnected local area networks (LANs), wide area networks (WANs), intranets, extranets, and conglomerations of many networks, such as the Internet, for example.

As illustrated, the hosts 210 are general purpose computer systems such as personal computers, mini-computers, mainframes or the like that exchange data, as will be explained, over the network 200. It is to be understood, however, that the hosts 210 may be many different types of computing or data exchanging devices such as file servers, web-site servers, network-telephony devices, audio or video servers, and so forth and that the invention is not limited to application only in a computer network or only for data exchange between devices of a specific type.

The data communication devices 201 provide the processing resources (routing and switching algorithms, queues, buffers, switching fabrics, data busses, backplanes, input and output ports, and so forth) to propagate data through the network 200 between the hosts 210. The data communication devices 201 may be any type of data processing device that can transfer, switch, route or otherwise direct or propagate data in a network. Possible examples of data communications devices 201 are network access servers, routers, switches, hubs, bridges, gateways, proxy servers, firewalls, modem banks, concentrators, repeaters, and similar data transfer devices, or any combination thereof. Preferred embodiments of invention are implemented within the data communications devices 201 and allow each device 201 to dynamically reserve bandwidth to one or more sessions of data communication between hosts 210 and allow the amount of bandwidth that is reserved by or to those sessions to be changed without disrupting the sessions that are using the reserved bandwidth or that require a change in the amount of reserved bandwidth in each data communications device 201.

FIG. 3 is suitable for illustrating some example operations of embodiments of the invention which are helpful in understanding more detailed embodiments presented later. In FIG. 3, suppose, for example, that host 210-A1 is a video server that serves a stream of video packets 203 (the "A" video stream) across the communications network 200 to recipient hosts 210-A2 and 210-A3 using a multicasting protocol. Furthermore, assume that in order for a receiving host 210-A2, 210-A3 to properly receive the "A" video stream 203 with adequate quality, the hosts 210-A2, 210-A3 require an end-to-end network bandwidth of 100 Kilobits per second (Kbps). That is, each data communications device 201-B through 201-E that transports the stream of "A" video packets 203 between sending host 210A1 and recipient hosts 210-A2 and 210-A3 must supply a minimum data transfer rate (i.e., bandwidth) of 100 Kbps for the "A" video stream 203.

Due to the critical or real-time nature of data in the "A" video stream 203, the sending and receiving hosts 210-A1, 210-A2 and 210-A3, in conjunction with the data communications devices 201-B, 201-C 201-D and 201-E use a bandwidth reservation protocol such as RSVP to establish and reserve a 100 Kbps channel for the "A" video stream 203 through the network 200. Specifically, using RSVP, each data communications device 201-B, 201-C 201-D and 201-E receives RSVP path and bandwidth reservation request messages (not specifically shown in this figure) which specify, among other things, an identity of a specific session of data communication (the "A" video stream 203 in this example), an amount of bandwidth to reserve for the session of data communication (100 Kbps in this example), and the path for which the to requested bandwidth is to be reserved for the specified data stream (i.e., 203) within each particular device 201-B through 201-E. In an alternative embodiment, the network policy server 150 supplies the requests to each device 201 (in the form of commands) which tell the devices 201 how much bandwidth to reserve for flows, streams, or sessions of data communication in the network 200.

According to the invention, each data communication device 201 contains a bandwidth reservation processor 500 (abbreviated B.R.P. in FIG. 4) and a data transporter 300 (abbreviated. D.T. in FIG. 4). In the illustrated example, only device 201-B is illustrated with the bandwidth reservation processor 500 and the data transporter 300, though it is assumed for this example that all devices 201 are configured in a similar manner. All of the processing associated with the reservation and allocation of bandwidth is performed by the bandwidth reservation processor 500 in a device 201, while all of the processing associated with the transport of data (e.g., stream 203) through a device 201 is handled separately and concurrently by the data transporter 300. Using this configuration, a data communications device 201 can configure, control and adjust (if needed) bandwidth reservation requirements for streams of data (e.g., alter the 100 Kbps channel for the "A" video data stream 203) independently of transferring the actual data (e.g., the "A" data stream packets) through the device 201.

Continuing with the example, the bandwidth reservation processor 500 in each device 201-B through 201-E receives the RSVP path and bandwidth reservation request messages. If the bandwidth reservation processor 500 determines that a requesting application or host (e.g., receiving hosts 210-A2 or 210-A3) has permission or privileges to reserve the requested bandwidth (e.g., RSVP policy control) and also determines that the requested resource (e.g., the 100 Kbps bandwidth) is available in the device 201, the bandwidth reservation processor 500 in each data communications device 201-B through 201-E grants the request and establishes the 100 Kbps bandwidth reservation for the "A" data stream 203 along the path from sending host 210-A1 to receiving hosts 210-A2 and 210-A3. Once the bandwidth reservation is established, each data communications device 201-B through 201-E transports data (i.e., packets) associated with the session of data communication (i.e. the "A" video data stream 203) using the reserved 100 Kbps resources (data storage locations in this invention, as will be explained).

Extending the example, assume that each recipient host 210-A2 and 210-A3 receives the "A" data stream 203 at the reserved rate of 100 Kbps. That is, the bandwidth reservation processor 500 configures each data communications device 201-B through 201-E with a bandwidth reservation of 100 Kbps of its total bandwidth (i.e., its total data transfer capacity or throughput for the path specified for, or required by, the data stream) for the "A" video stream packets 203 which are continuously delivered to the recipient hosts 210-A2 and 210-A3 in real-time across network 200. If a video client application (not shown) executing on recipient host 210-A3 senses that more network bandwidth is required (such as 120 Kbps) to effectively receive the "A" video data stream 203, the host 210-A3 can use RSVP to make a bandwidth reservation request (not shown) containing bandwidth allocation adjustment information to each network device 201-E, 201-D, 201C and 201-B. The bandwidth allocation adjustment information in the bandwidth reservation request specifies a request for 120 Kbps of bandwidth to be reserved for the "A" video data stream 203.

Using the invention, the bandwidth reservation processor 500 in each device 201-E through 201-B along the path of the "A" data stream 203 receives the RSVP bandwidth allocation adjustment information. Assuming bandwidth resources (i.e., an extra 20 Kbps) are available to meet the needs of the additional request (e.g. RSVP admission control), and that permission is granted for the requesting host (e.g., 210-A3) or client application to increase bandwidth to the requested level, the bandwidth reservation processor 500 in each device 201-E through 201-B dynamically adjusts the original bandwidth reservation of 100 Kbps to produce a new bandwidth reservation of 120 Kbps for the "A" video data stream 203 while continually maintaining (i.e., transporting) the "A" video data stream 203. Essentially, the invention's implementation of the separation of bandwidth reservation, adjustment and control from the transportation of data through a data communications device, as configured according to the invention allows a session of data communication to be uninterrupted during adjustments to bandwidth for that session.

Figure 1:
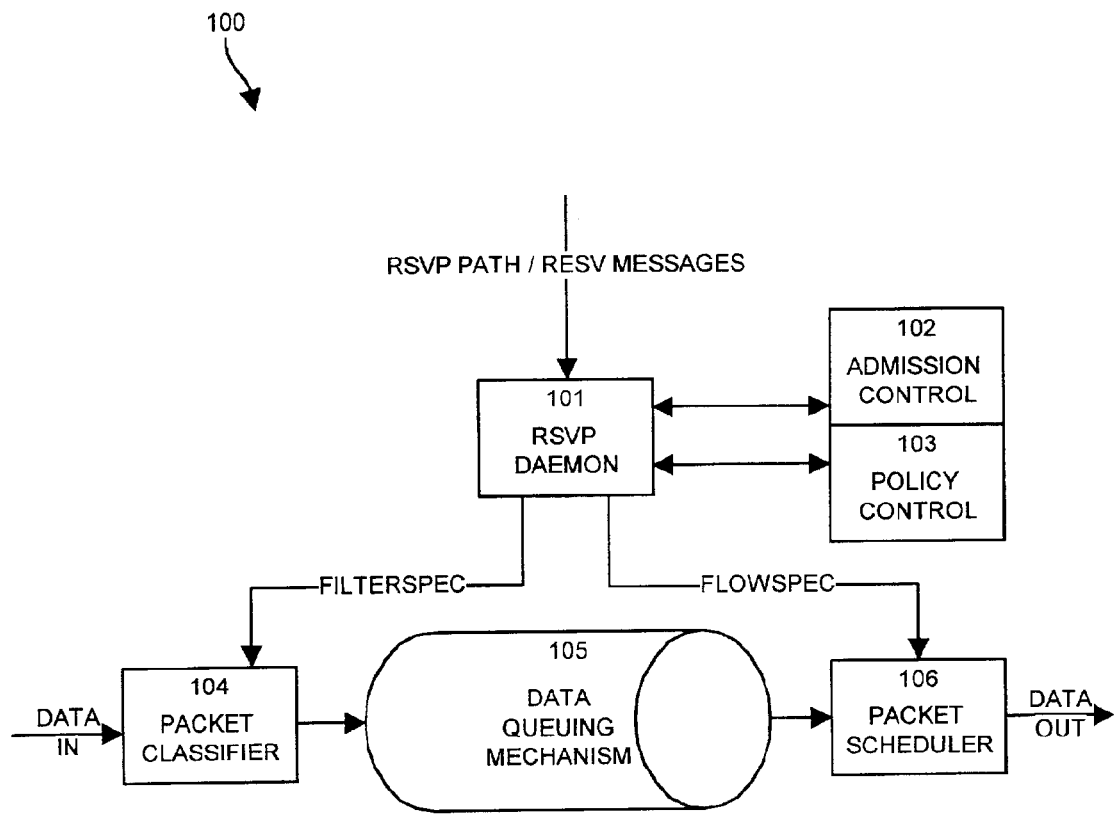
FIG. 1 illustrates a typical prior art implementation of the RSVP protocol used to reserve bandwidth within a data communications device.
Figure 4:
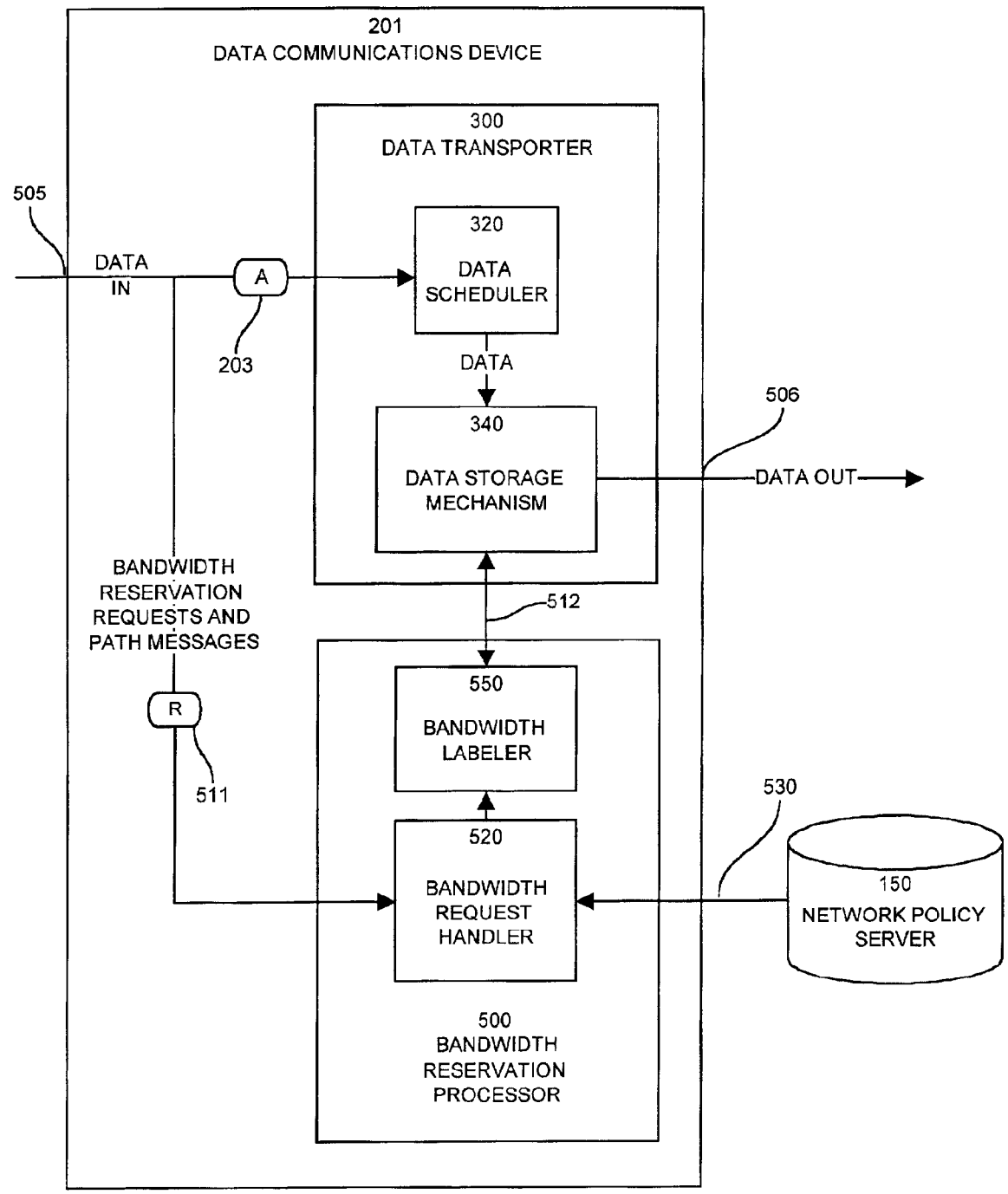
FIG. 4 illustrates an internal architecture and data flow diagram of a data communications device configured according to one embodiment of the invention.

FIG. 4 illustrates a more detailed architecture of a data communications device 201 configured according to one embodiment of the invention which provides the processing capabilities explained above. In this embodiment, the data communications device 201 contains the data transporter 300 including a data scheduler 320 and a data storage mechanism 340, and the bandwidth reservation processor 500 including a bandwidth request handler 520 and a bandwidth labeler 550. At least one input port 505 is provided in the data communications device 201 which is illustrated as receiving application or session data (e.g., the "A" video data stream packets 203 in FIG. 1) and RSVP reservation requests and path messages 511, shown as an "R" packet. An output port 506 is also provided which transmits data onto the network 200. Only one input and output port 505, 506 are illustrated for ease of description of the invention. It is to be understood that many ports serving as both input and output ports may exist in a preferred embodiment of the data communications device 201.

The network policy server 150 is also shown in this embodiment to illustrate that the bandwidth reservation processor 500 can receive commands 530 to govern bandwidth allocation operations (as explained herein), instead of using bandwidth reservation requests 511 from individual hosts 201. This alternative arrangement may be beneficial when each data communications device 201 network-wide is to have a permanent amount of dedicated reserved bandwidth for use by a special purpose application or network wide (e.g. multicast) session of data communication, for example.

According to the general operation of the data communications device 201, initial bandwidth reservation for a particular session of data communication is generally performed before data communication for the session actually begins. The invention however is equally applicable to situations where a session of data communication is already established (i.e., data transport is underway across the network) but there is no particular amount of bandwidth pre-allocated for that session in the data communications devices 201 which are transporting the data. That is, the invention can be used to establish a bandwidth reservation concurrently with an active session of data communication that is already being transported through a network without having to disrupt or interrupt the session in any way. In a similar manner, as explained in the above example, the invention can also be used to adjust or modify a bandwidth reservation already assigned to a data communication session that is underway and that is currently being transported through a network.

To reserve bandwidth for a session(s) of data communication in any of these situations, the data communications device 201 receives bandwidth reservation requests and path messages 511 which are directed to the bandwidth request handler 520. The bandwidth request handler 520 is a process that executes on the data communications device 201 and is responsible for accepting or denying the bandwidth reservation requests 511. If accepted, the bandwidth request handler 520 provides one or more data structures called sender state data 504 (FIG. 5) to the bandwidth labeler 550. Sender state data 504 specifies source and destination points for a particular session or sessions of data communication that exist (or that will exist) (i.e., the "A" video stream data 203 in FIG. 3), a path (i.e., input port to output port) for the session or sessions of data communication, and an amount of bandwidth (e.g., 100 Kbps) required to be reserved for the session or sessions over the specified path.

The path in the sender state data 504, in this example embodiment, indicates a route is through which the session data travels (DATA IN, DATA and DATA OUT in FIG. 4) within the data communication device 201 from an input port 505 at which the session data is received, through the data transporter 300 (to be explained shortly), to an output port 506 which transmits the session data towards its destination. In this example embodiment, assuming a session of data communication enters and exits only through a single pair of input and output ports 505, 506 in the data communications device 201, the slowest port of a single input/output port pair 505, 506 limits the amount of bandwidth available. By way of example, assuming the input and output ports 505, 506 are configured the same (i.e., have the same maximum bandwidths), if the ports 505, 506 each support a connection data rate of 400 Kbps, then the bandwidth reservation processor 500 can reserve a maximum of 400 Kbps for a session of data communication on these ports. In the example provided above with respect to the initial bandwidth reservation provided for the "A" video data stream 203 in FIG. 1, the bandwidth request handler 520 produces sender state data 504 that specifies that a session of "A" video data requires 100 Kbps of bandwidth between input port 505 and output port 506.

Once the bandwidth labeler 550 obtains the sender state data 504, the bandwidth labeler 550 accesses 512 the data storage mechanism 340 to establish the requested bandwidth reservation as specified in the sender state data 504. The bandwidth labeler 550, as its name implies, operates (as will be explained in more detail) to label a certain percentage of data storage locations (not shown in this figure) maintained within the data storage mechanism 340 with the identity (i.e., a label) of the session of data communication for which bandwidth is to be reserved as specified in the sender state data 504. Using the aforementioned example, the bandwidth labeler 550 labels a certain percentage of data storage locations used to transfer data between input port 505 and output port 506 in the data storage mechanism 340 with a label corresponding to the "A" video data stream 203. The percentage of storage locations labeled is based upon the amount of bandwidth requested (100 Kbps) as indicated in the bandwidth reservation request, which is also provided in the sender state data 504.

In this manner, bandwidth reservation is accomplished via use of the bandwidth reservation processor 500 which accesses the data storage mechanism 340 to label certain data storage locations with a labels corresponding to the sessions of data communication requiring reserved bandwidth.

During a session of data communication, the input port 505 receives packets of application data 203 (which in this invention generally refers to data transferred in a session of data communication) directs them to the data scheduler 320. The data scheduler 320 schedules or deposits the data packets 203 into data storage locations (not specifically shown) within the data storage mechanism 340 which have corresponding labels provided by the bandwidth labeler 550. The data storage mechanism 340 then operates to transport the application data packets 203 back onto the network 200 from an appropriate output port 506, in order to send the application data 203 further towards its eventual destination (e.g., one of receiving hosts 210-A2, 210-A3 in FIG. 1 in this example).

It is important to understand that the data scheduler 320 does not need to be made aware or provided with an indication of each different session (active or not) of data communication (i.e., "A" data stream 203) for which bandwidth is reserved in the data communications device 201 configured according to this embodiment of the invention. Rather, the data scheduler 320 only needs to look at each data packet 203 to determine if the packet is associated with any session of data communication and if so, the data scheduler 320 deposits the packet into a data storage location in the data storage mechanism 340 that has a corresponding label equivalent to the label for the session contained in the packet header 180 (e.g., in the Tspec field 191 in FIG. 2). One or more fields 184 through 191 in packet header 180, as explained with respect to FIG. 3, are preferably used to determine if a particular packet 203 is associated with any session(s) of data communication or not. In other embodiments, non-header fields such as data field 183 (FIG. 2) may be used to determine if the packet 510 (FIG. 2) (or cell, frame, etc.) is associated with a session of data communication corresponding to a labeled storage location.

In this manner, the bandwidth reservation processor 500 reserves bandwidth in a data communications device 201 without requiring the data scheduler 320 to be notified each time bandwidth is allocated for a session of data communication. This aspect of the invention also allows the bandwidth reservation processor 500 to adjust bandwidth for a session of data communication without requiring any runtime changes or notifications to be made, or provided, to the data scheduler 320. That is, the data scheduler 320 can remain ignorant of how many sessions of data communication are currently active and/or have bandwidth reserved in the data communications device 201. Instead, the data scheduler 320 can focus on repetitively depositing packets into data storage locations having labels that match an RSVP packet header 180, if any. If no RSVP packet header 180 or other session identifier information exists for a packet, then the data scheduler 320 deposits that packet into any data storage location that is not presently labeled.

Figure 5:
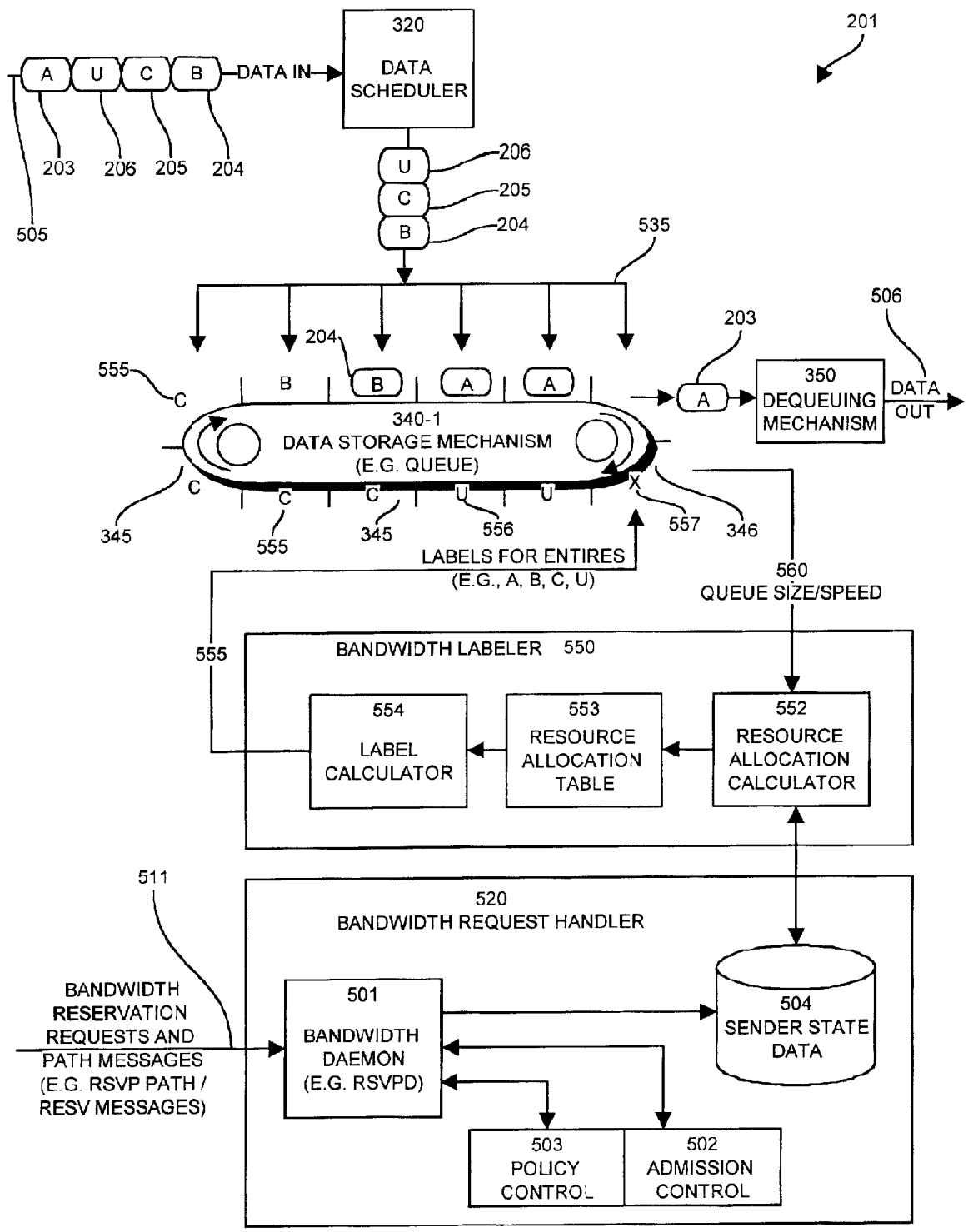
FIG. 5 illustrates a more detailed architecture and data flow diagram for a data communications device configured according to the invention.

FIG. 5 illustrates a more detailed embodiment of a data communications device 201 configured according to the invention. In the example illustrated in FIG. 5, there are four active flows of data 203, 204, 205 and 206 that are transported through the data communications device 201. Each flow is pictured at various positions of transit within the device 201 as one or more small circular packets which are labeled with a letter "A", "B", "C" or "U" to indicate the flow to which that packet belongs. The flows "A" 203, "B" 204 and "C" 205 represent sessions of data communication for which bandwidth is reserved in the data communications device 201. The flow "U" 206, in which the "U" stands for unreserved, represents all other application data that is transported through the device 201 for which there is no specific amount of bandwidth reserved.

Since there is no specific bandwidth reservation established for the "U" data flow 206, the device 102 services the "U" flow 206 in a best-effort manner using any remaining unreserved device bandwidth (e.g., using any unlabeled or unreserved data storage locations, such as location 556 in FIG. 5).

In this embodiment, the data storage mechanism 340 (FIG. 4) is represented as a single circular rotating queue structure 340-1 that includes a number of queue entries 345. In this particular example, there are twelve available queue entries 345 arranged in the circular formation as shown in FIG. 5. Each queue entry 345 is capable of storing one packet of data (i.e., one packet of a flow 203, 204, 205 or a packet of unreserved data 206) while the packet awaits transmission from a port (e.g. output port 506) in the device 201. In this illustration, the conveyor belt-like queue structure 340-1 rotates in a clockwise direction. The data scheduler 320 deposits data packets (e.g., packets from flows 203 through 206) into the various queue entries 345, as indicated by the arrows 535, as will be explained in more detail shortly. Note that in this example, the data scheduler 320 can deposit data packets 203–206 into more than one queue entry 345 at one time as they arrive at the data scheduler 320. This is indicated by arrows 535 that point to more than one queue entry 345. As a packet 203 through 206 waits in the queue 340-1, a dequeuing mechanism 350 services the queue 340-1 at periodic intervals and the queue 340 rotates clockwise as the dequeuing mechanism 500 services each entry 345 (rotation indicated by the circular arrows at each end of the queue 340-1) so that queue 340-1 shifts the packets from left to right and closer to a dequeuing mechanism 350 on the right end of the queue 340-1.

The dequeuing mechanism 350 removes the data packets 203 through 206 from the queue 340-1 as they appear at the right-most end and transfers the data packets from the device 201 via output port(s) 506 onto the network 200. The speed at which the dequeuing mechanism 350 dequeues packets, the rotation of the queue 340-1, and the number of queue entries 345 that make up the queue 340-1 generally determine the overall bandwidth that can be provided to transport data to the output port 506. It is assumed in this example that the input and output ports 505, 506 can handle data faster that the data transporter 300 and that, for purposes of this explanation, the data scheduler 320 can examine the packet headers (e.g., RSVP header 180) to determine where to direct a packet (e.g., 203 through 206) at a rate that is greater than the overall maximum bandwidth for a port or session of data communication. Thus the data scheduler 320 does not act as a bottleneck in the device 201.

Of particular importance to the invention is the manner in which the data scheduler 320 deposits data packets 203 through 206 into the queue 340-1 within the data storage mechanism 340. Since the invention in this embodiment eliminates the need for the data scheduler 320 to be made aware of what particular data flows or sessions of data communication (e.g., 203 through 205) have associated reserved bandwidth at any point in time, the data scheduler 320 simply examines information in each packet 203 through 206 that arrives at the input port 505 and deposits that packet into a queue entry 345 that contains a label, such as label 555 "C", that matches the information examined in the packet (i.e., 203 through 206).

Figure 2:
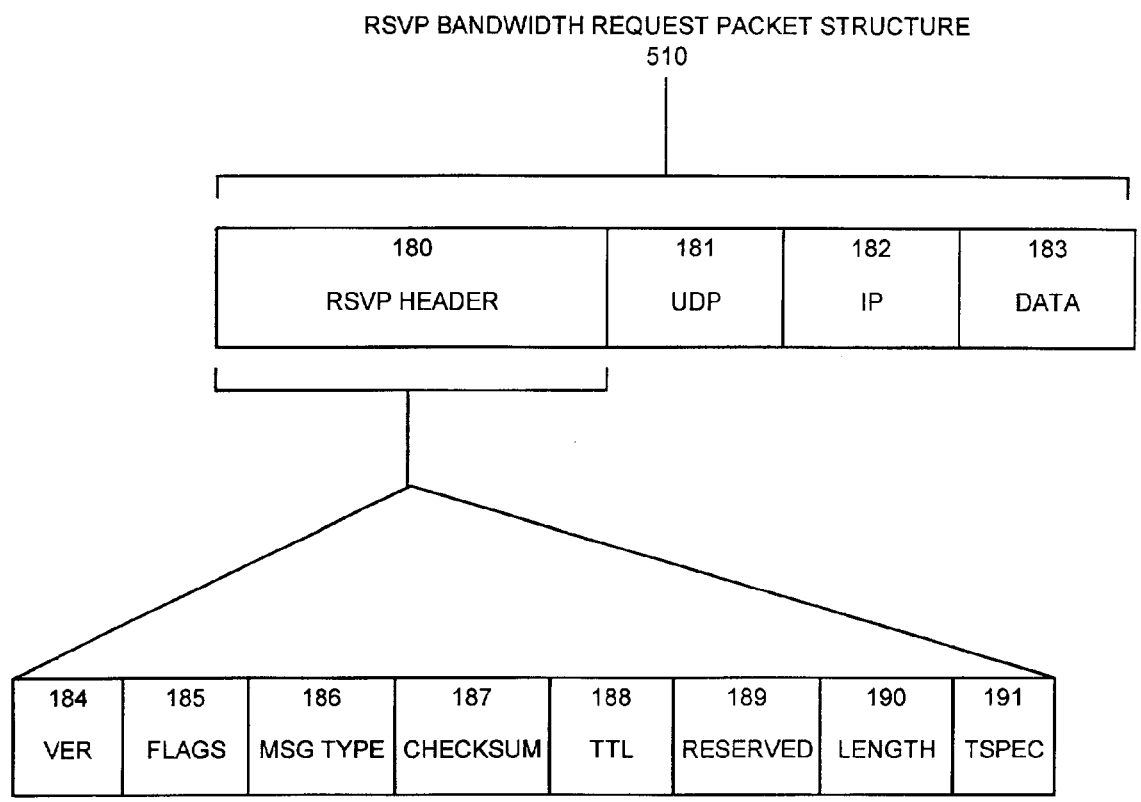
FIG. 2 illustrates the structure of a prior art packet used to transfer data according to the RSVP protocol.

The information examined in each packet 203 through 206 is preferably packet or RSVP header information contained in one or more of header fields 180, 181 and 182, as illustrated in FIG. 2. As indicated above in the discussion of FIG. 4, the bandwidth labeler 550 labels (during the independent operation of the bandwidth reservation processor 500) certain queue entries 345 (i.e., data storage locations) based upon the sender state data 504. This labeling process will be discussed in more detail shortly. In any event, as packets 203 through 206 arrive from the input port 505, the data scheduler 320 determines if each packet 203 through 206 has an associated identification of one or more sessions of data communication (that may or may not have reserved bandwidth, which is unimportant as far as the data scheduler 320 is concerned), as specifically indicated, for example, by the Tspec field 191 in each packet 510 (FIG. 2). Based on the value in the Tspec field 191, the data scheduler 320 deposits the packets 203 through 205 (206 not having a Tspec field since packet 206 is not associated with a particular flow or session of data communication having reserved bandwidth) into queue entries 345 that have identification labels (e.g., 555) corresponding to the identification (Tspec field 191) of the session of data communication for those packets 203 through 205.

In other words, the data scheduler 320 is coupled to the input port 505 to receive data packet 203 through 206 associated with one or more sessions of data communication (e.g., "A" 203, "B" 204, etc.) and deposits the data packets 203 through 205 associated with that session(s) into data storage locations (queue entries 345 in this embodiment) associated with the bandwidth reservation for each session. The data scheduler 320 deposits "U" Packets 206 that are not associated with a particular session of data communication into queue entries 345 that have either no label (i.e., do not contain a label 555 for a reserved bandwidth session) or a label indicating that the entry 345 is unreserved, as illustrated by the example queue entry label "U" 556.

In this manner, the data transporter 300 including the data scheduler 320 and the data queuing mechanism 340 operate independently of the bandwidth reservation processor 500 to continually maintain and transport one or more sessions of data communication along with data (e.g., 206) not specifically associated with reserved bandwidth reserved in the device 201. The operations of the data scheduler 320 and data storage mechanism 340 (e.g. queue 340-1) can be performed irrespective of the current bandwidth reservations (i.e., number of labeled queue entries 345) that may exist or that may change for session(s) of data communication (e.g. streams "A" 203, "1B" 204, "C" 205).

The bandwidth reservation processor 500 including the bandwidth request handler 520 and the bandwidth labeler 550 operates asynchronously with the data transporter 300 mechanisms (e.g., 320, 340) and is responsible for labeling the queue entries 345 in the queue 340-1. Using the data storage location labeling techniques explained herein, bandwidth reservations are established and maintained for each session of data communication 203 through 205. The techniques also allow for data 206 which is not specifically associated with reserved bandwidth sessions to be transported as well.

More specifically, with respect to the example embodiment in FIG. 5, the bandwidth request handler 520 receives bandwidth reservation requests and path messages 511 (e.g., from hosts 210 on network 200 in FIG. 3). The reservation request and path messages 511, as previously explained, are used to request bandwidth reservations in the device 201 for one or more flows or sessions of data communication, such as 203 through 205 in this example. In this embodiment, the bandwidth request handler 520 includes a bandwidth daemon 501 which preferably is an RSVP protocol daemon process (e.g., RSVPD) that executes on a processor (not specifically shown) within the device 201. The bandwidth daemon 501 receives the bandwidth request and path messages 511 and consults the admission control module 502 and the policy control module 503 to determine, respectively, bandwidth resource availability and access control permission with respect to a requesting host 205 or application. Once access is granted and the bandwidth resources are determined to be available, the bandwidth daemon 501 creates the sender state data 504.

In this example embodiment, sender state data 504 includes, for each session of data communication for which bandwidth resources are requested (e.g., each session listed in the sender state data, such as streams 203 through 205), an identity of the session of data communication, an amount of bandwidth associated with the session of data communication, and the path (e.g., input/output port pair) through the device 201 that the session of data communication is to traverse using the reserved bandwidth resources. More specifically, Table 1 below illustrates an example of the sender state data 504 created by the bandwidth daemon 501, including some example requested bandwidth rates to be reserved for the sessions or flows "A" 203, "B" 204 and "C" 205 in FIG. 5.

TABLE 1

Example of Sender State Data 504

| SESSION IDENTIFICATION | REQUESTED RESERVED BANDWIDTH | SESSION PATH (PORT-TO-PORT) |
|---|---|---|
| "A" | 100 Kbps | Input Port 505- Output Port 506 |
| "B" | 64 Kbps | Input Port 505- Output Port 506 |
| "C" | 132 Kbps | Input Port 505- Output Port 506 |

As shown in Table 1, the request 511 (FIG. 5) for the "A" session 203 (i.e., hosts sending and receiving this stream or flow of data) indicates that 100 Kbps of bandwidth is to be reserved, while the "B" session 204 has requested 64 Kbps of bandwidth, and the "C" session 205 has requested 132

Kbps. In this example, each of these flows or sessions of data communication "A" 202, "B" 204 and "C" 205 are traveling on the same path through the device 201 configured with the sender state data 504 in Table 1. In other words, in the example embodiment shown in FIG. 5, an assumption is made that queue 340-1 services a single path within the data communications device 201. For example, queue 340-1 may be associated with the output port 506. Assuming there are many output ports in the device 201, each output port (e.g. 506) in this embodiment thus has its own associated queue structure similar to 340-1 provided in order to buffer or store data packets (e.g., packets 203 through 206) that are to be transported from that output port onto the network 200.

To assist in the explanation of the operation of this example embodiment, it is also assumed that the maximum total bandwidth for the output port 506 is 400 Kbps. Thus when the data scheduler 320, queue 340-1 and dequeuing mechanism 350 all operate at peak capacity, a maximum bandwidth or throughput of 400 Kbps is available from the output port 506.

To configure bandwidth reservations for each flow or session of data communication (e.g., "A", "B", "C") defined in the sender state data 504, the bandwidth labeler 550 in this embodiment includes a resource allocation calculator 552, a resource allocation table 553, and a label calculator 554.

The resource allocation calculator 552 creates labeling information that is maintained in the resource allocation table 553 based on the sender state data 504. To do so, in this embodiment, the resource allocation calculator 552 obtains as input 560 the size and speed of rotation of the data storage mechanism 340 (e.g. queue 340-1). Essentially, the resource allocation calculator 553 calculates and stores a percentage of total bandwidth (for the path to the output port 506 in this example) to allocate or reserve for each session of data communication based on the sender state data 504 as defined by the received bandwidth reservation requests 511.

Figure 6A:
FIG. 6A illustrates a resource allocation table created illustrating example data flow resource allocations according to an embodiment of the invention.

FIG. 6A illustrates an example of the contents of the resource allocation table 553. In Column 1 "FLOW ID", the resource allocation table 553 provides an identification of each flow or session of data communication (e.g., "A", "B", "C"), and includes an entry marked "U" representing resource allocation data for all data (e.g. packets 206) not specifically associated with any session or reserved bandwidth. Column 2 "PERCENT UTILIZATION" indicates a percent utilization of total bandwidth for the queue 340-1 to which this resource allocation table 553 is associated. Column 3 "ENTRY COUNT OF TOTAL QUEUE SIZE" indicates the number of queue entries 345 that should be labeled in the queue 340-1 for each particular flow (i.e., row) represented in the resource allocation table 553.

As noted above, the resource allocation calculator 552 obtains as input the queue size and speed data 560 from the data storage mechanism 340. Using this information in conjunction with the sender state data 504, the resource allocation calculator 552 computes PERCENT UTILIZATION and ENTRY COUNT OF TOTAL QUEUE SIZE values for each flow or session of data communication (e.g., "A" 203, "B" 204, "C" 205) in the sender state data 504.

The resource allocation calculator 552 computes PERCENT UTILIZATION by converting the requested bandwidth to be reserved for each data flow or session to a percentage of total bandwidth for the queue 340-1. In this embodiment, the queue size/speed data 560 determines total bandwidth for the path. In this example, the queue 340-1 has a queue size equal to twelve queue entries 345. Each entry 345 can store one packet (e.g., one packet 203 through 206).

A packet size in this embodiment is assumed to constant at 1000 bits. The queue speed in this example is assumed to be 33⅓ rotations per second. Based on these values, the total bandwidth for this queuing structure 340-1 can be computed as follows:

QUEUE_BANDWIDTH=TOTAL_NUMBER_OF_ENTRIES*ENTRY_SIZE*ROTATIONS_PER_SECOND.

Or for this particular embodiment, overall total queue bandwidth equals:

400 Kbps=(12 Queue entries)*(1000 bit entry size)*(33⅓ Rotations per second).

Once the total queue bandwidth is calculated, PERCENT UTILIZATION may be calculated as follows:

PERCENT UTILIZATION=REQUESTED_BANDWIDTH_PER_FLOW/QUEUE_BANDWIDTH.

In the example embodiment, since the overall queue bandwidth is 400 Kbps using the requested reserved bandwidth values from Table 1 (sender state data 504), the PERCENT UTILIZATION for each FLOW ID for flows "A", "B" and "C" (203 through 205) is computed as follows:

| | |
|---|---|
| FLOW ID A | .25 = 100 Kbps/400 Kbps |
| FLOW ID B | .16 = 64 Kbps/400 Kbps |
| FLOW ID C | .33 = 132 Kbps/400 Kbps |
| Total Reserved: | .74 * 100 = 74 Percent. |

Any remaining bandwidth, expressed as a percentage (i.e., 100 percent−Total Reserved percentage), is allocated to all unreserved data packets 206 (e.g. all data with FLOW ID="U"). In this example, data associated with FLOW ID "U" gets 26 percent of the total bandwidth, since that is the remaining amount of bandwidth not reserved to the sessions of data communication 203 through 205.

The resource allocation calculator 552 computes ENTRY COUNT OF TOTAL QUEUE SIZE (Column 3) values in the resource allocation table 553 based on the percent utilization of each FLOW ID in proportion to the number of total queue entries 345 in the queue 340-1. The final result may be rounded or the allocation can be adjusted over each rotation of the data storage mechanism 340-1 so the average transmission rate converges to the correct percentage. Specifically, in this example embodiment:

ENTRY COUNT OF TOTAL QUEUE SIZE=PERCENT UTILIZATION* TOTAL_NUMBER_OF_ENTRIES.

In the example embodiment, since there are twelve queue entries 345 in the queue 340-1, the ENTRY COUNT OF TOTAL QUEUE SIZE values are computed as follows:

| | |
|---|---|
| FLOW ID A | 3 = .25 * 12 |
| FLOW ID B | 2 = .16 * 12 |
| FLOW ID C | 4 = .33 * 12 |
| FLOW ID U | 3 = .25 * 12 |
| TOTAL LABELED | 12 |

Once the resource allocation calculator 552 computes the data in the resource allocation table 553, the label calculator 554 can use the resource allocation table 553 to properly produce labels (e.g., 555) for the queue entries 345 in the queue 340-1. As indicated in FIG. 5, the label calculator 554 accesses the resource allocation table 553 to determine how many entries 345 are to be labeled with each particular session identification label or FLOW ID which identifies the session (FIG. 6A). As indicated in the example resource allocation table 553 in FIG. 6A, the label calculator 552 labels three queue entries 345 with "A", two queue entries 345 with "B", four queue entries 345 with "C", and three queue entries 345 with "U", for a total of twelve labeled queue entries that make up the total queue 340-1.

Figure 6B:
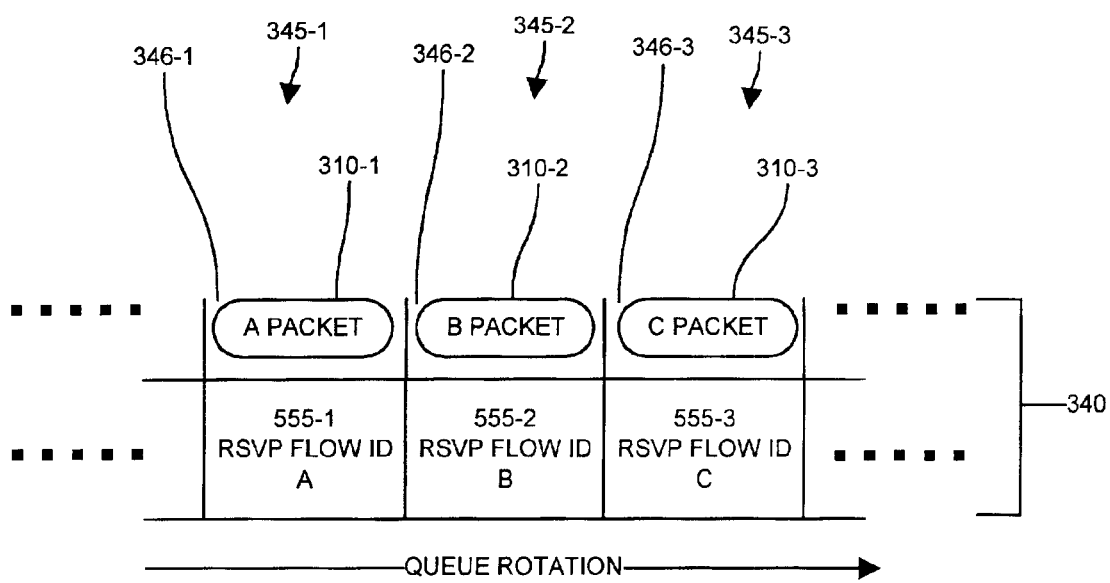
FIG. 6B illustrates a detailed view of a queue entry labeling arrangement according to one embodiment of the invention.

FIG. 6B illustrates in more detail an example structure of the queue entries 345 that make up the queue 340-1. Each entry 345-1, 345-2 and 345-3 is essentially a data storage location 346-1, 346-2, 346-3 that includes an associated label portion 555-1, 555-2 and 555-3, respectively. The data scheduler 321 deposits the data (i.e. packets 310) into the data storage location portion 346 of the entry 345 in this figure. As indicated in this sample segment of the queue 340, the data storage location 346-1 for queue entry 345-1 currently stores an A-PACKET 310-1 that is associated with the "A" session of data communication 203 (FIG. 5), while the data storage location 346-2 for queue entry 345-2 stores a B-PACKET 310-2 that is associated with the "B" session of data communication 204 (FIG. 5), and the data storage location 346-3 for queue entry 345-3 stores a C PACKET 310-3 that is associated with the "C" session of data communication 205. These packets 310-1, 310-2 and 310-3 are stored in these respective locations 346-1, 346-2 and 346-3 because the labels for these locations 555-1, 555-2 and 555-3 created by the label calculator 554 in the bandwidth labeler 550 match the session or flow identification information contained in the header 180 of each packet 310-1, 310-2 and 310-3. That is, the data scheduler 320 places the A-packet 310-1 into the location 346-1 because the label 555-1 indicates that the location 346-1 is reserved for "A" data 203.

Accordingly, by labeling the data storage locations 345 that form the queue 340-1 with the appropriate labels 555 for each flow identification (FLOW ID, Column 1) specified in the resource allocation table 553, the bandwidth labeler 550 can constantly maintain the appropriate amount of reserved bandwidth for each session of data communication 203, 204, 205. The data scheduler 320 uses the entries 345 that are either unlabeled by the bandwidth labeler 550 or that are labeled with a "U" (signifying unreserved or unlabeled), as indicated by label 556 in FIG. 5, to deposit any data (e.g. data packets 206) that does not contain a flow or session identification.

In this embodiment, the bandwidth labeler 550 can continuously monitor the sender state data 504 for changes in bandwidth requests (i.e., bandwidth reservations or changes that have been granted by the bandwidth daemon 501) for any session of data communication (e.g. 203, 204, 205). Once a change is detected in the sender state data 504, the resource allocation calculator 552 recalculates the values in the resource allocation table 553. The label calculator 554 detects this change and then correspondingly alters the labeling of the queue entries 345 to effectuate the requested bandwidth change.

In this manner, the system of the invention allows bandwidth to be dynamically adjusted without affecting the data scheduler 320. That is, since the bandwidth reservation processor 500 adjusts a proportionate number of labels 555, 556, etc. for sessions of data communication within the queue entries 345, the maximum allowable bandwidth for the sessions (e.g. 203, 204 or 205 in this example) is inherently governed, since the data scheduler 320 can only place as many packets of session data (i.e. 310) into labeled queue entries 345 as there are matching labels 555 associated with the entries 345.

By isolating the operation of the data scheduler 320 from the bandwidth reservation processor 500 as shown in the previous embodiments, it has been illustrated how bandwidth may be reserved and adjusted dynamically at any time before, during, or after one or more sessions of data communication (e.g. 203 through 205) are in operation. Once the data scheduler 320 queues a data packet 310 for a session of data communication in the queue 340-1, the data 310 remains in the data storage location 346 until it is dequeued by dequeuing mechanism 350. The label calculator 554 in this embodiment only labels 555 or changes labels of queue entries 345 that do not already contain data 310. In this manner, the data scheduler 320 and queue 340-1 operate in continuously the same manner. This allows any session data in the "pipeline" comprising the input port 505, data scheduler 320, queue 340-1, dequeuing mechanism 350, and output port 506 to remain undisturbed during a change in bandwidth.

Recall that prior art implementations of bandwidth reservation require a session of data communication to be broken or halted for a period of time while classification, scheduling, queuing, and dequeuing mechanism are all reconfigured to handle the new bandwidth requirements. Once reconfigured, the session can then be reinstated. The system of the invention avoids much of this effort and allows the session to be continually transmitted before, during and after bandwidth allocations or adjustments. The adjustments take effect dynamically as the new label configurations for the data storage locations 345 in queue 340-1 are used. Thus the bandwidth labeler 550 can dynamically re-label queue entries 345 and the new labels are used by the data scheduler 320 to deposit session data.

An example highlights the particular importance of this aspect of the invention. Suppose that the device 201 is currently transporting the "B" session 204 of data communication at a maximum bandwidth of 64 Kbps, as illustrated in FIG. 5 and in the resource allocation table in 553 in FIG. 6A. Next assume that the "B" stream 204 requires more bandwidth. The new bandwidth required might be, for example, 100 Kbps. This may be sensed by one of the receiving hosts 205-A2, 205-A3 (FIG. 3), for example, that determines that the current allocation of 64 Kbps is insufficient and that an additional 36 Kbps would correct the situation. Using RSVP or another bandwidth reservation protocol, the bandwidth request handler 520 receives the request for additional bandwidth 511 (either a request for an additional 36 Kbps, or a request for a change from 64 Kbps to 100 Kbps, or a new reservation request for 100 Kbps for the "B" stream).

Assuming the bandwidth daemon 501 grants the request 511, the sender state data 504 for the SESSION IDENTIFICATION "B" indicates a REQUESTED RESERVED BANDWDITH value of 100 Kbps. The resource allocation calculator 552 detects the change in the sender state data 504 and updates the resource allocation table 553 as explained above so that FLOW ID "B" (which was set at 16 percent with 2 queue entries labeled with "B"), now contains a PERCENT UTILIZATION value of 0.25 (or 25 percent of the total 400 Kbps bandwidth for this path) and an ENTRY COUNT OF TOTAL QUEUE SIZE value of 3. When the resource allocation table 553 is updated in this manner, the label calculator 554 detects the change and begins to re-label the queue entries 345 according to the new information in the resource allocation table 553. Once the label calculator 554 re-labels all entries 345 in the queue 340-1, three entries 345 are labeled with a "B" instead of two as in the previous configuration. Note that the label calculator 554 preferably operates to re-label queue entries 345 just after the dequeuing mechanism 350 removes the data (310 in FIG. 6B) from each entry 345. The "X" in the data storage location 346 in FIG. 5 indicates that the queue entry 346 is now void of any data packet 310 and can be re-labeled if required.

Alternative embodiments of the invention provide that the label calculator 554 always operates to continuously label entries 345 according to the resource allocation table 553. In this manner, if the number of labels required for all sessions having reserved data exceeds the total number of queue entries 345 in the overall queue 340-1, each entry 345 is provided with a different label upon being emptied by the dequeuing mechanism 350. In other words, if the rotation speed 560 of a short queue 340-1 (i.e. a queue 340-1 having so few entries 345 that all entries 345 combined cannot hold the total amount of reserved bandwidth) is fast enough, the label calculator 554 can simply provide labels for every entry 345 after that entry passes the dequeuing mechanism 350. In this manner, a short queue changes its labeling configuration with each rotation, and the label calculator controls the bandwidth allocation for each session via the labels for the entries 345.

All data packets (e.g., packets for sessions 203 through 205 and unreserved data packets 206) that currently exist in the queue 340-1 during the labeling process remain queued and eventually propagate their way to the dequeuing mechanism 350. Preferably, relabeling takes place as soon as each entry 345 in the queue 340-1 is emptied or dequeued of its data packet 310 by the dequeuing mechanism 350. As the relabeled queue entries 345 make their way clockwise around to the data scheduler 320 to obtain more data packets 310, the new labeling configuration (i.e., the queue 340-1 now containing three "B" labeled entries 345) will dictate what data can be placed into which entries 345. In this manner, the bandwidth can be changed for the session of data communication 204 without disrupting the transport of data for the session.

Figure 7:
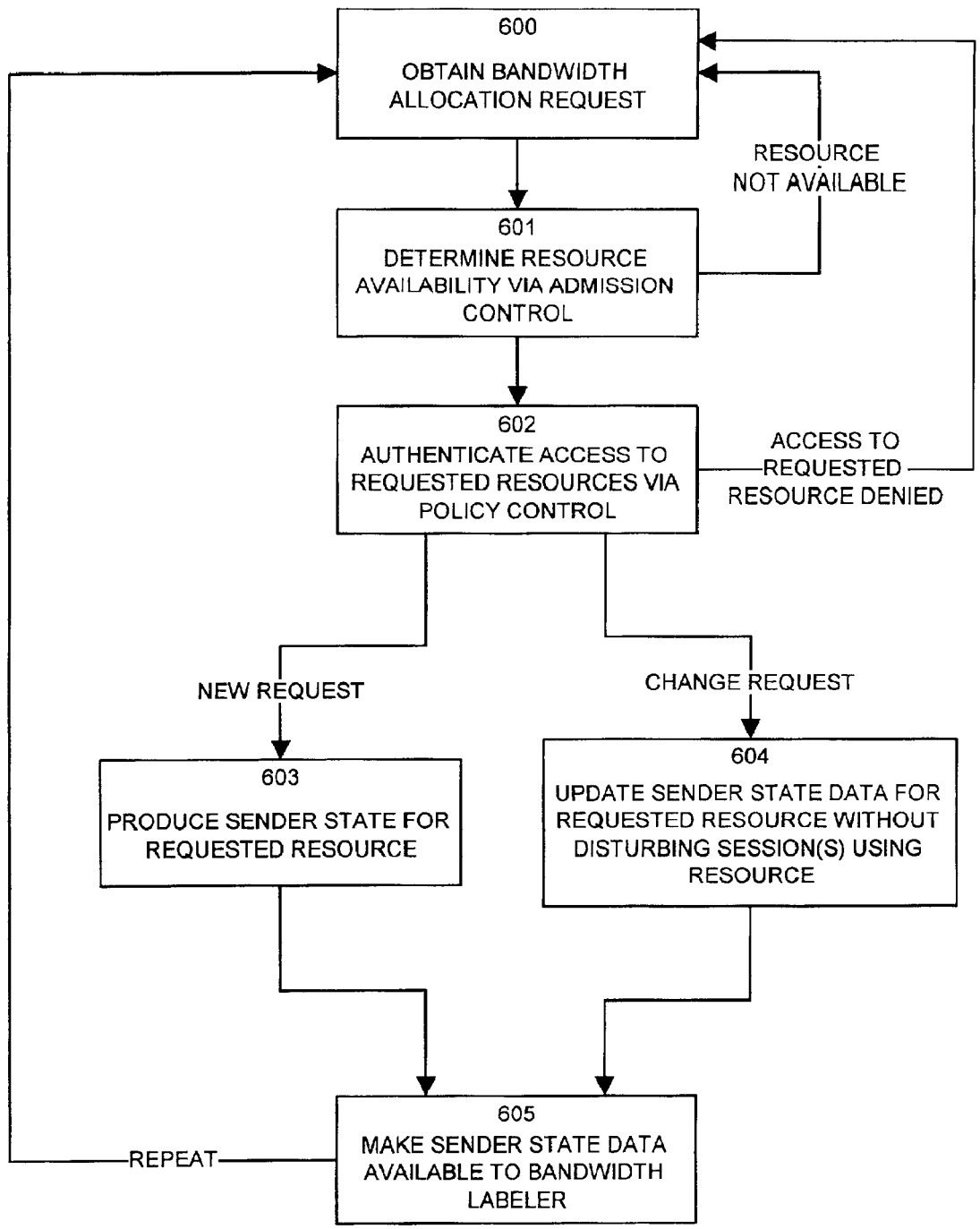
FIG. 7 illustrates bandwidth policy and admission control processing steps performed by a bandwidth reservation processor configured according to one embodiment of the invention.

FIG. 7 illustrates the processing steps performed by the bandwidth request handler 520 configured according to this invention. In step 600, the bandwidth allocation request 511 is obtained from the network 200. In step 601, the bandwidth daemon 501 determines the requested resource availability via admission control. If the requested resource is not available, the bandwidth daemon 501 processing denies the request and returns to step 600. If the bandwidth daemon 501 in step 601 does not deny the request, the bandwidth daemon 501 in step 602 authenticates access to the requested resource via policy control. If in step 602 the bandwidth daemon 501 determines that the access should not be granted to the requested resource, the bandwidth daemon 501 denies the request and processing returns to step 600. If steps 601 and 602 pass, step 602 directs processing depending upon the type of request (511) received. If the request 511 is a new request to reserve bandwidth for a session that does not yet have bandwidth reserved, the processing proceeds to step 603 and the bandwidth daemon 501 produces the new sender state data 504 for a session identification associated with the newly requested resource. If however step 602 determines that the request 511 is requesting alteration of a resource already reserved to a particular session or sessions of data communication, then processing follows as explained in step 604.

In step 604, the bandwidth daemon 501 updates the sender state data 504 that already exists for the requested resource, without disturbing any session or sessions of data communication that may be using that resource (i.e., without notifying the data scheduler 320). In step 605, the bandwidth daemon 501 makes the sender state data 504 available to the bandwidth labeler 550 so that the bandwidth labeler 550 can label (e.g., 555) the data storage locations (e.g., entries 345) accordingly in the data storage mechanism 340, which is preferably the rotating queue structure 340-1 discussed above. By making the sender state data 504 available to the bandwidth labeler 550, the bandwidth request handler 520 can focus its operation primarily on bandwidth request processing and does not need to make the sender state data 504 available to other components of the system, such as the data scheduler 320 or the dequeuing mechanism 350.

Figure 8A:
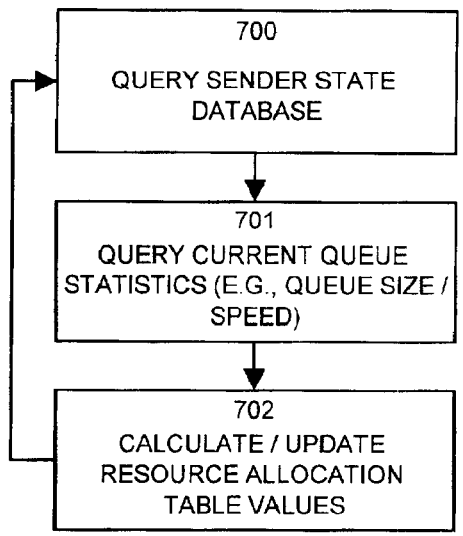
FIG. 8A illustrates resource allocation calculation processing steps performed according to one embodiment of the invention.

FIG. 8A shows the general processing steps performed by the resource allocation calculator 552 in the bandwidth labeler 550 according to one embodiment of the invention. In step 700, the resource allocation calculator 552 queries the sender state database 504. Alternatively, step 700 may be performed by having any changes in the sender state data 504 be signaled (i.e., via step 605 in FIG. 7) to the resource allocation calculator 552. In step 701, current statistics of the data storage mechanism 340 such as queue size (e.g., total number of entries 345) and speed (e.g., how many entries are dequeued over a period of time, rotation, etc.) are queried to determine the overall current bandwidth characteristics for the requested path. Step 702 then calculates and/or updates the resource allocation table 553 values (Columns 1, 2 or 3) with the current session attributes, as explained above. In this manner, the processing of FIG. 8A converts the sender state data 504 into meaningful data usable by the label calculator 554 to label (555 in FIG. 6B) the data storage location 346 (i.e., queue entries 345) in the data storage mechanism 340 (e.g., queue 340-1).

Figure 8B:
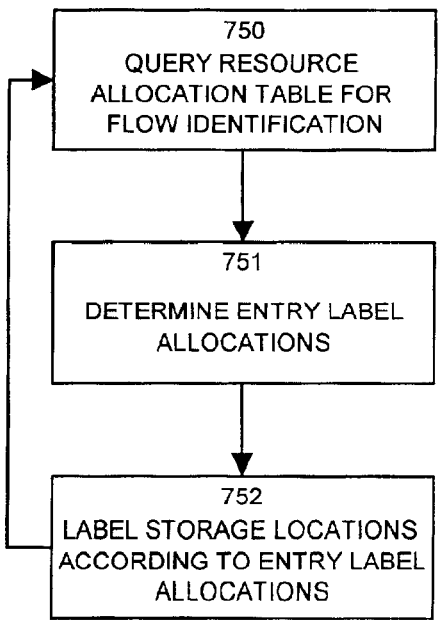
FIG. 8B illustrates queue entry label processing steps performed by a bandwidth labeler configured according to one embodiment of the invention.

FIG. 8B shows the general processing steps associated with the label calculator 554. In step 750, the label calculator 554 queries the resource allocation table 553 for flow label identification (i.e., Columns 1 and 3). This step could be triggered by a change in the resource allocation table 553, or may be performed periodically or continuously. Step 751 then determines queue entry 345 label allocations.

In one embodiment, step 751 consults the entry label counts for each session of data communication as indicated in Column 3 of the resource allocation table 553. Step 752 then labels 555 the entries 345 according to the entry label calculations. The labeling of queue entries 345 may proceed serially by labeling entries 345 with all of the "A" labels (e.g., 3 "A" labels 555), and then when there are no more "A" labels remaining, labeling entries 345 with "B" labels (2 in the example) until none remain, and so forth. With respect to the example resource allocation table 553 in FIG. 6A, the twelve labeled entries in the example queue 340-1 in FIG. 5 would have a labeling order as follows:

"A" "A" "A" "B" "B" "C" "C" "C" "C" "U" "U" "U"

However, as will be explained next with respect to FIGS. 9A and 9B, the label calculator 554 may label the entries 345 in the queue 340 in step 752 in a variety of other patterns so as to evenly distribute labeled entries 345 for each session or FLOW ID, depending upon the selected embodiment.

Figure 9A:
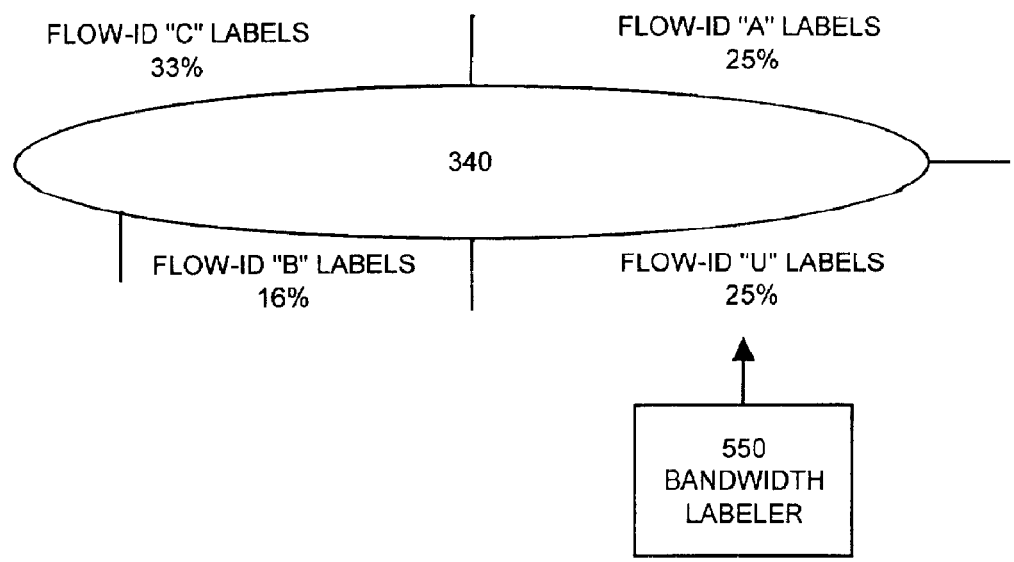
FIG. 9A illustrates how data storage locations can be labeled according to percentages of flow bandwidth per flow according to one embodiment of the invention.

FIG. 9A illustrates an example of a labeling pattern. In FIG. 9A, the bandwidth labeler 550 sequentially "uses up" the labels for each session having a reserved resource in a serial manner, and when none are left, moves on to the next set of labels. As indicated in the figure, which corresponds to the bandwidth reservations established in the resource allocation table 553 in FIG. 6A, the "A" session of data communication 203 has twenty-five percent of the bandwidth reserved via "A" labels in the queue entries 345. Thus the data scheduler 320 in FIG. 5 is able to queue "A" data packets 203 into one quarter of the entire queue space on each rotation. The "C" data stream has thirty-three percent of the queue reserved, and the "B" stream has sixteen percent reserved. This leaves a remaining twenty-five percent of the queue entries 345 labeled with "U", or not labeled at all. The "U" labeled entries 345 are used for all data 206 that does not belong to a session having a bandwidth reservation in this device 201.

It may be apparent to those skilled in the art that a situation might arise where the data scheduler 320 detects an RSVP header that indicates a session identification (i.e., a labeled packet) for which there are currently no corresponding labeled queue entries 345. The invention addresses this situation in a number of ways. First, the data scheduler 320 can simply buffer the data until an entry 345 having a corresponding label 555 appears. After a certain time period, which preferably corresponds to a certain number of rotations of the queue 340, if no labeled entry 345 appears (to the data scheduler 320) that matches the packet data (with a session identification) that is buffered with the unknown session identification, the data scheduler 320 can either discard the unknown session data or can simply deposit the data into one of the data storage locations that is indicated as being unreserved (i.e. labeled "U"). The later mechanism (queuing into an unreserved entry 345) is preferred over the packet discard mechanism, since data will not be lost and will not require re-transmission from the sender if the unknown data stream has such error detection/correction capabilities enabled.

In this manner, if session data is transported to a device 201 which is unaware of the existence of the session, the invention still allows the data to be transported as if it were unlabeled data not associated with any particular session. In prior art systems in which a classifier and scheduler are made aware of all active sessions, the unknown session data might confuse the classifier and/or scheduler and may require either, at a minimum, to pause operation to consult with the RSVP daemon (e.g., 101 in FIG. 1) to determine how to handle the unknown session data. The invention avoids such cumbersome approaches and keeps the data transport mechanism separated from the bandwidth allocation and administration aspects of the device 201.

Figure 9B:
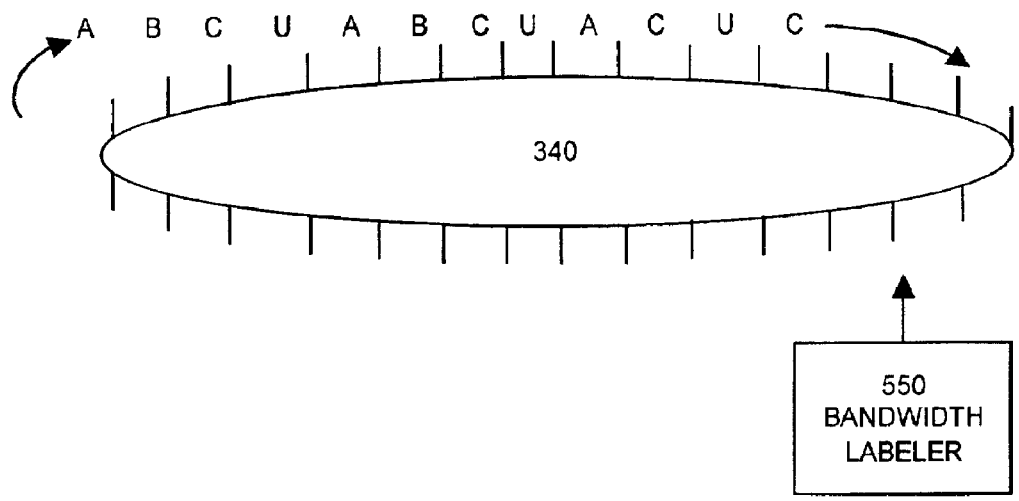
FIG. 9B illustrates how data storage locations can be labeled according to another embodiment of the invention.

FIG. 9B illustrates another labeling pattern which can be used by the label calculator 554 to label queue entries 345 with session labels. The approach taught in FIG. 9B is cycling label approach. In this approach, the label calculator 554 repetitively cycles through each FLOW ID in the resource allocation table 553 and labels one queue entry 345 for each session or flow id per cycle. During the repetitive cycling, the label calculator 554 decrements the number of labels remaining for each FLOW ID. When a FLOW ID has no labels remaining (i.e., its ENTRY COUNT OF TOTAL QUEUE SIZE value is zero), no more labels are created for that session or flow identification. In this manner, a more balanced approach is provided for the queue entry labeling process of the invention, since each flow is provided with a labeled entry 345 that is separated from another similarly labeled entry 345 by other entries labeled for other flows that still have more bandwidth to be reserved (i.e., more entries that are to be labeled). As illustrated in FIG. 9B, from left to right, the labels on queue entries 345 appear in this example as follows:

"A" "B" "C" "U" "A" "B" "C" "U" "A" "C" "U" "C"

In total, there are three "A" entries, two "B" entries, four "C" entries, and three "U" entries, and that the entries are somewhat staggered from each other. The sequence A-B-C-U begins at the left and repeats itself twice, after which there are no more "B" labels to be produced, and so the remaining "A" and "U" labels are produced. In this manner, the bandwidth labeler 550 presents a more even distribution of labeled (i.e., reserved) bandwidth entries 345 so that the data scheduler 320 does not have to wait for significant periods of time while buffering data and awaiting for an entry with the correct label to appear.

In yet another embodiment of the bandwidth labeler 550 and the label calculator 554, the label calculator 554 only labels the queue entries 345 each time the resource allocation table 553 changes. As such, the labels (e.g. 555 in FIGS. 5 and 6B) remain allocated or associated with each entry 345 as the entry 345 continually circulates around and around the queue 340. In this manner, the bandwidth reservations for each session are static until they need to be changed. That is, the only time the queue entries 345 are relabeled is if a change is detected to the bandwidth reservations as communicated by the change in data values in the resource allocation table 553. This embodiment conserves processing resources used by the bandwidth labeler 550, which can enter an idle state until the sender state data 504 changes. The change causes the resource allocation calculator 552 to "wake up" and update the resource allocation table 553, which in turn causes the label calculator 554 to re-label entries 345 as required.

It is to be understood by those skilled in the art that the labeling patterns in FIGS. 9A and 9B are illustrative as examples only, and are not limiting of the present invention. Rather, other fair, weighted, or even distribution schemes known to those skilled can be used to label the sequence of queue entries 345 so as to best distribute the reserved bandwidth for each session of data communication across the entire queue 340-1. For example, in an alternative embodiment, each queue entry 345 may be larger than the size of a single packet. In such cases, an entry 345 may hold many packets, cells, frames, or other unit of data from the session of data communication. In another alternative embodiment, each entry may have more than one label. That is, is two or more sessions of data communication are somehow related, or have equivalent bandwidth reservations (e.g., same percentage for both sessions), the bandwidth reservation processor might label a single entry with more than one session identification. In this manner, the data scheduler 320 can deposit any one or a number of different packets into the multi-labeled entry 345.

It is also to be understood that the invention is not limited to applications providing bandwidth reservation and allocation using the RSVP protocol. Rather, the invention is intended to operate in conjunction with other bandwidth reservation, allocation, or adjustment protocols that currently exist or that may be developed in the future. For example, future versions of RSVP may provide specific message formats to enable bandwidth adjustments. The invention provides implementations of data communications devices as explained herein that can take advantage of such messages to dynamically adjust bandwidth as required for sessions of data communication.

For more details on the operation of bandwidth reservation protocols such as RSVP and its derivatives, the reader is directed to Request For Comments 2205 and 1633 and RSVP93 (RFC-2205, RFC-1633, RSVP93), published by the Network Working Group of the Internet Engineering Task Force (IEFT), and available on the Internet at ftp://ftp.isi.edu/in-notes/rfc2205.txt, each of which protocol references is hereby incorporated by reference in their entirety.

The invention applies to all types of data transmitted to or from any type of device through any type of network and/or network communications medium. While the illustrated examples discuss packet data which is primarily applicable to Transmission Control Protocol/Internet Protocol (TCP/IP) networks such as the Internet, the invention is equally applicable to networks that use such units of data as tokens, cells, frames, blocks, and so forth. Other network architectures such as Asynchronous Transfer Mode (ATM) networks can use the concepts of the invention as well to reserve bandwidth for cell transfer. Also, networking architectures such as packet-wireless, Fiber Distributed Data Interface (FDDI), Systems Network Architecture (SNA), Digital Subscriber Link (DSL), Advanced Peer-to-Peer Networking (APPN) and others may benefit from use of the invention.

Another alternative scenario that could illustrate the features of the invention would be to have several networked computers each running different types of applications having different data communications requirements. The data produced from each application may need to be transferred between the computers at different reserved rates. The invention could be used to provide this capability. It is also understood that a data communications device 201 configured according to the invention may have one or more data schedulers 320 and one or more data queues 340. An arrangement such as a single data scheduler per input port that can deposit data into many different queues 340-1, 340-2, etc., where there is one queue 340 per output port is contemplated as a device configured according to the invention. Other arrangements are possible as well which are contemplated by the invention. Such alternative arrangements and alternative designs of data communications devices can apply the concepts of the invention as disclosed herein to provide dynamic bandwidth reallocation without interrupting streams of data, since the operation of the bandwidth allocation mechanisms are generally separated from the data transport mechanisms, as explained herein.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for dynamically adjusting reserved bandwidth in a data communications device while transporting a session of data communication within the device, the method comprising the steps of:

receiving a first RSVP bandwidth reservation request associated with application data of a session of data communication, the first RSVP bandwidth reservation request distinct from the application data;

establishing a first bandwidth reservation associated with the application data of the session of data communication in the data communications device based upon the first RSVP bandwidth reservation request;

labeling, with an identity of the session of data communication, a first percentage of available data storage locations used to store application data transported through the data communications device thus establishing the first bandwidth reservation, wherein the first percentage of storage locations labeled is based upon the first amount of bandwidth requested as indicated in the first RSVP bandwidth reservation request;

transporting, through the data communication device, application data associated with the session of data communication utilizing data storage locations associated with the first bandwidth reservation;

receiving bandwidth allocation adjustment information, within a second RSVP bandwidth reservation request, associated with application data of the session of data communication and during the session of data communication, the second RSVP bandwidth reservation request distinct from the application data; and dynamically adjusting the first bandwidth reservation to produce a second bandwidth reservation for the application data of the session of data communication based upon the bandwidth allocation adjustment information within the second RSVP bandwidth reservation request while continually maintaining the session of data communication.

2. The method of claim 1 wherein, after the step of receiving the first RSVP bandwidth reservation request, the step of establishing a first bandwidth reservation further includes the step of:

calculating and storing a first percentage of total device bandwidth to allocate to the application data of the session of data communication based upon the first RSVP bandwidth reservation request; and wherein the first percentage of data storage locations labeled in the step of labeling is based upon the calculated first percentage of total device bandwidth to allocate to the application data of the session of data communication.

3. The method of claim 2 wherein the step of calculating and storing, stores the calculated first percentage in a resource allocation table which is independently accessible by the step of labeling and the step of dynamically adjusting, so as to allow the step of dynamically adjusting to alter the calculated percentage in the resource allocation table without disrupting the step of labeling, thus allowing the bandwidth reservation in the device to be adjusted without effecting operation of the step of transporting.

4. The method of claim 1 wherein the step of dynamically adjusting the first bandwidth reservation to produce a second bandwidth reservation includes the step of:

labeling, with an identity of the session of data communication, a second percentage of available data storage locations used to store data transported through the data communications device thus establishing the second bandwidth reservation, wherein the second percentage of storage locations labeled is based upon the second amount of bandwidth requested as indicated in the second RSVP bandwidth reservation request wherein the second percentage of storage locations labeled is different than the first percentage of storage locations labeled.

5. The method of claim 4 wherein, after the step of dynamically adjusting the first bandwidth reservation to produce a second bandwidth reservation further includes the step of:

calculating and storing a second percentage of total device bandwidth to allocate to the application data of the session of data communication based upon the second RSVP bandwidth reservation request; and wherein the second percentage of data storage locations labeled in the step of labeling is based upon the calculated second percentage of total device bandwidth to allocate to the application data of the session of data communication.

6. The method of claim 5, wherein the step of calculating and storing, stores the calculated second percentage in a resource allocation table as a replacement for the calculated first percentage; and wherein the resource allocation table is independently accessible by the step of labeling and the step of dynamically adjusting, so as to allow the step of dynamically adjusting to alter the calculated first percentage in the resource allocation table without disrupting the step of labeling, thus allowing the first bandwidth reservation in the device to be adjusted without effecting operation of the step of transporting.

7. The method of claim 5 wherein the step of calculating includes the steps of:
obtaining a current measurement of data communications device data storage locations available for data storage and a current bandwidth utilization rate; and
computing an amount of bandwidth to reserve for the session of data communication based on the current bandwidth utilization rate and on the current measurement of data communication device data storage locations available for data storage.

8. The method of claim 4 wherein the step of labeling comprises labeling, with a label associated with the session of data communication, a second percentage of available queue entries of a queue used to store application data transported through the data communications device to establish the second bandwidth reservation, the second percentage of available queue entries labeled based upon the second amount of bandwidth to reserve as indicated in the second RSVP bandwidth reservation request wherein the second percentage of storage locations labeled is different than the first percentage of storage locations labeled.

9. The method of claim 8 further comprising:
examining information associated with application data of the session of data communication; and
depositing application data of the session of data communication into a queue entry of the second percentage of available queue entries, each of the second percentage of available queue entries having a label corresponding to the information associated with the application data.

10. The method of claim 9 wherein the step of examining information comprises examining a data stream identification field within a header of the application data of the session of data communication.

11. The method of claim 4 further comprising:
examining information associated with application data of the session of data communication; and
depositing application data of the session of data communication into the second percentage of available data storage locations, each of the second percentage of available data storage locations having an identity corresponding to the information associated with the application data.

12. The method of claim 11 wherein the step of examining information comprises examining a data stream identification field within a header of the application data of the session of data communication.

13. The method of claim 1 wherein the step of labeling comprises labeling, with a label associated with the session of data communication, a first percentage of available queue entries of a queue used to store application data transported through the data communications device to establish the first bandwidth reservation, the first percentage of available queue entries labeled based upon the first amount of bandwidth to reserve as indicated in the first RSVP bandwidth reservation request.

14. A data communications device comprising:
at least one communications interface;
a memory;
a processor; and
an interconnection mechanism coupling the at least one communications interface, the memory, and the processor;
wherein data communications device is configured to:
receive a first RSVP bandwidth reservation request associated with application data of a session of data communication, the first RSVP bandwidth reservation request distinct from the application data;
establish a first bandwidth reservation associated with the application data of the session of data communication in the data communications device based upon the first RSVP bandwidth reservation request;
label, with an identity of the session of data communication, a first percentage of available data storage locations used to store application data transported through the data communications device thus establishing the first bandwidth reservation, wherein the first percentage of storage locations labeled is based upon the first amount of bandwidth requested as indicated in the first RSVP bandwidth reservation request:
transport, through the data communication device, application data associated with the session of data communication utilizing data storage locations associated with the first bandwidth reservation;
receive bandwidth allocation adjustment information, within a second RSVP bandwidth reservation request, associated with application data of the session of data communication and during the session of data communication, the second RSVP bandwidth reservation request distinct from the application data; and
dynamically adjust the first bandwidth reservation to produce a second bandwidth reservation for the application data of the session of data communication based upon the bandwidth allocation adjustment information within the second RSVP bandwidth reservation request while continually maintaining the session of data communication.

15. The data communications device of claim 14 wherein, after receiving the first RSVP bandwidth reservation request, when establishing a first bandwidth reservation, the data communications device is configured to:
calculate and store a first percentage of total device bandwidth to allocate to the application data of the session of data communication based upon the first RSVP bandwidth reservation request; and
wherein the first percentage of data storage locations labeled is based upon the calculated first percentage of total device bandwidth to allocate to the application data of the session of data communication.

16. The data communications device of claim 15 wherein, when calculating and storing, the computerized device is configured to store the calculated first percentage in a resource allocation table which is independently accessible when labeling dynamically adjusting, so as to allow the data communications device to alter the calculated percentage in the resource allocation table without disrupting the device when labeling, thus allowing the bandwidth reservation in the device to be adjusted without effecting operation of the device when transporting.

17. The data communications device of claim 14 wherein when dynamically adjusting the first bandwidth reservation to produce a second bandwidth reservation, the data communications device is configured to:
labeling, with an identity of the session of data communication, a second percentage of available data storage locations used to store data transported through the data communications device thus establishing the second bandwidth reservation, wherein the second percentage of storage locations labeled is based upon the second amount of bandwidth requested as indicated in the second RSVP bandwidth reservation request wherein the second percentage of storage locations labeled is different than the first percentage of storage locations labeled.

18. The data communications device of claim 17 wherein, after dynamically adjusting the first bandwidth reservation to produce a second bandwidth reservation, the data communications device is further configured to:

calculating and storing a second percentage of total device bandwidth to allocate to the application data of the session of data communication based upon the second RSVP bandwidth reservation request; and wherein the second percentage of data storage locations labeled in the step of labeling is based upon the calculated second percentage of total device bandwidth to allocate to the application data of the session of data communication.

19. The data communications device of claim 18, wherein when calculating and storing, the data communications device is configured to store the calculated second percentage in a resource allocation table as a replacement for the calculated first percentage; and wherein the resource allocation table is independently accessible by the data communications device when labeling and dynamically adjusting, so as to allow the data communications device, when dynamically adjusting, to alter the calculated first percentage in the resource allocation table without disrupting the data communications device when labeling, thus allowing the first bandwidth reservation in the device to be adjusted without effecting operation of the step of transporting.

20. The data communications device of claim 19 wherein, when calculating the data communications device is configured to:

obtain a current measurement of data communications device data storage locations available for data storage and a current bandwidth utilization rate; and compute an amount of bandwidth to reserve for the session of data communication based on the current bandwidth utilization rate and on the current measurement of data communication device data storage locations available for data storage.

21. The data communications device of claim 17 wherein, when labeling, the data communications device is configured to label, with a label associated with the session of data communication, a second percentage of available queue entries of a queue used to store application data transported through the data communications device to establish the second bandwidth reservation, the second percentage of available queue entries labeled based upon the second amount of bandwidth to reserve as indicated in the second RSVP bandwidth reservation request wherein the second percentage of storage locations labeled is different than the first percentage of storage locations labeled.

22. The data communications device of claim 17 wherein the data communications device is configured to:

examine information associated with application data of the session of data communication; and deposit application data of the session of data communication into the second percentage of available data storage locations, each of the second percentage of available data storage locations having an identity corresponding to the information associated with the application data.

23. The data communications device of claim 22 wherein, when examining, the data communications device is configured to examine a data stream identification field within a header of the application data of the session of data communication.

24. The data communications device of claim 17 wherein the data communications device is configured to:

examine information associated with application data of the session of data communication; and deposit application data of the session of data communication into a queue entry of the second percentage of available queue entries, each of the second percentage of available queue entries having a label corresponding to the information associated with the application data.

25. The method of claim 24 wherein when examining wherein, when examining, the data communications device is configured to examine a data stream identification field within a header of the application data of the session of data communication.

26. The data communications device of claim 14 wherein, when labeling, the data communications device is configured to label, with a label associated with the session of data communication, a first percentage of available queue entries of a queue used to store application data transported through the data communications device to establish the first bandwidth reservation, the first percentage of available queue entries labeled based upon the first amount of bandwidth to reserve as indicated in the first RSVP bandwidth reservation request.

27. A computer program product having a computer-readable medium including computer program logic encoded thereon that, when performed on a controller in a computerized device having a coupling to at least one communications interface provides a method for performing the operations of:

receiving a first RSVP bandwidth reservation request associated with application data of a session of data communication, the first RSVP bandwidth reservation request distinct from the application data;

establishing a first bandwidth reservation associated with the application data of the session of data communication in the data communications device based upon the first RSVP bandwidth reservation request;

labeling, with an identity of the session of data communication a first percentage of available data storage locations used to store application data transported through the data communications device thus establishing the first bandwidth reservation, wherein the first percentage of storage locations labeled is based upon the first amount of bandwidth requested as indicated in the first RSVP bandwidth reservation request;

transporting, through the data communication device, application data associated with the session of data communication utilizing data storage locations associated with the first bandwidth reservation;

receiving bandwidth allocation adjustment information, within a second RSVP bandwidth reservation request, associated with application data of the session of data communication and during the session of data communication, the second RSVP bandwidth reservation request distinct from the application data; and dynamically adjusting the first bandwidth reservation to produce a second bandwidth reservation for the application data of the session of data communication based upon the bandwidth allocation adjustment information within the second RSVP bandwidth reservation request while continually maintaining the session of data communication.

28. A content subscriber comprising:

at least one communications interface;

a controller; and an interconnection mechanism coupling the at least one communications interface and the controller;

wherein the computerized device is configured to produce a means for accessing presence information, such means including:

means for receiving a first RSVP bandwidth reservation request associated with application data of a session of data communication, the first RSVP bandwidth reservation request distinct from the application data;

means for establishing a first bandwidth reservation associated with the application data of the session of data communication in the data communications device based upon the first RSVP bandwidth reservation request;

means for labeling, with an identity of the session of data communication, a first percentage of available data storage locations used to store application data transported through the data communications device thus establishing the first bandwidth reservation, wherein the first percentage of storage locations labeled is based upon the first amount of bandwidth requested as indicated in the first RSVP bandwidth reservation request;

means for transporting, through the data communication device, application data associated with the session of data communication utilizing data storage locations associated with the first bandwidth reservation;

means for receiving bandwidth allocation adjustment information, within a second RSVP bandwidth reservation request, associated with application data of the session of data communication and during the session of data communication, the second RSVP bandwidth reservation request distinct from the application data; and means for dynamically adjusting the first bandwidth reservation to produce a second bandwidth reservation for the application data of the session of data communication based upon the bandwidth allocation adjustment information within the second RSVP bandwidth reservation request while continually maintaining the session of data communication.

29. A method for dynamically adjusting reserved bandwidth in a data communications device while transporting a session of data communication within the device, the method comprising the steps of:

receiving a first RSVP bandwidth reservation request associated with application data of a session of data communication, the first RSVP bandwidth reservation request distinct from the application data;

establishing a first bandwidth reservation associated with the application data of the session of data communication in the data communications device based upon the first RSVP bandwidth reservation request;

labeling, with an identity of the session of data communication; a first percentage of available data storage locations used to store application data transported through the data communications device thus establishing the first bandwidth reservation, wherein the first percentage of storage locations labeled is based upon the first amount of bandwidth requested as indicated in the first RSVP bandwidth reservation request;

transporting, through the data communication device, application data associated with the session of data communication utilizing data storage locations associated with the first bandwidth reservation;

receiving bandwidth allocation adjustment information, within a second RSVP bandwidth reservation request, associated with application data of the session of data communication and during the session of data communication, the second RSVP bandwidth reservation request distinct from the application data; and dynamically adjusting the first bandwidth reservation to produce a second bandwidth reservation for the application data of the session of data communication based upon the bandwidth allocation adjustment information within the second RSVP bandwidth reservation request while continually maintaining the session of data communication; and labeling, with an identity of the session of data communication, a second percentage of available data storage locations used to store data transported through the data communications device thus establishing the second bandwidth reservation, wherein the second percentage of storage locations labeled is based upon the second amount of bandwidth requested as indicated in the second RSVP bandwidth reservation request, the second percentage of storage locations labeled being different than the first percentage of storage locations labeled.

* * * * *